US012572887B2

(12) United States Patent
    Tazume

(10) Patent No.: US 12,572,887 B2
(45) Date of Patent: Mar. 10, 2026

(54) CONTROL DEVICE, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 485 days.

(21) Appl. No.: 18/010,040

(22) PCT Filed: Feb. 26, 2021

(86) PCT No.: PCT/JP2021/007451
     § 371 (c)(1),
     (2) Date: Dec. 13, 2022

(87) PCT Pub. No.: WO2022/180807
     PCT Pub. Date: Sep. 1, 2022

(65) Prior Publication Data
     US 2023/0230024 A1      Jul. 20, 2023

(51) Int. Cl.
     G06Q 10/083 (2024.01)
(52) U.S. Cl.
     CPC .............................. G06Q 10/08355 (2013.01)
(58) Field of Classification Search
     CPC ............. G06Q 10/083; G06Q 10/0832; G06Q
                10/0833; G06Q 10/0835; G06Q 10/0837;
                                          G06Q 10/0838
     See application file for complete search history.

(56) References Cited

U.S. PATENT DOCUMENTS 10,346,889 B1 *  7/2019  Reiss ................. G06Q 10/0833
2019/0011926 A1   1/2019  Konishi et al.
(Continued)

FOREIGN PATENT DOCUMENTS

| | | |
|---|---|---|
| JP | 2018-151923 A | 9/2018 |
| JP | 2019-015711 A | 1/2019 |
| JP | 2020-113086 A | 7/2020 |
| JP | 2020-119337 A | 8/2020 |

OTHER PUBLICATIONS

Boysen, Nils, Stefan Schwerdfeger, and Felix Weidinger. "Scheduling last-mile deliveries with truck-based autonomous robots." European Journal of Operational Research 271.3 (2018): 1085-1099. (Year: 2018).*
International Search Report of PCT/JP2021/007451 dated May 25, 2021 [PCT/ISA/210].

*Primary Examiner* — Emmett K. Walsh
(74) *Attorney, Agent, or Firm* — Sughrue Mion, PLLC

(57)                    ABSTRACT

A control device (100) includes an acquirer (110) that, when an order is accepted, acquires vehicle location information indicating a location of a vehicle capable of storing a target of the order, start location information indicating a start location at which transportation of the target is started, and preparation information indicating preparation time required for preparation to bring a state of the target into a state where the transportation is startable or a preparation completion time at which the preparation is completed and a generator (120) that generates movement control information for causing the vehicle to move from the location of the vehicle to the start location, based on (i) an amount of energy that the vehicle is estimated to consume to move from the location indicated by the acquired vehicle location information to the start location indicated by the acquired start location information, and (ii) the preparation time or the preparation completion time indicated by the acquired preparation information.

20 Claims, 11 Drawing Sheets

(56) References Cited

U.S. PATENT DOCUMENTS

| | | | | |
|---|---|---|---|---|
| 2019/0114564 A1* | 4/2019 | Ferguson | ......... | G06Q 10/06315 |
| 2019/0340569 A1* | 11/2019 | Prager | ............... | G06Q 10/0832 |
| 2020/0160264 A1* | 5/2020 | Silverman | ........ | G06Q 10/06315 |
| 2020/0233411 A1* | 7/2020 | Ivanov | .................... | G08G 5/22 |

* cited by examiner

| | |
|---|---|
| 200 | 800 |
| TERMINAL DEVICE | VEHICLE |

| | |
|---|---|
| 100 | IN |
| CONTROL DEVICE | |

| | |
|---|---|
| 300 | 900 |
| TERMINAL DEVICE | VEHICLE |

Figure 2:
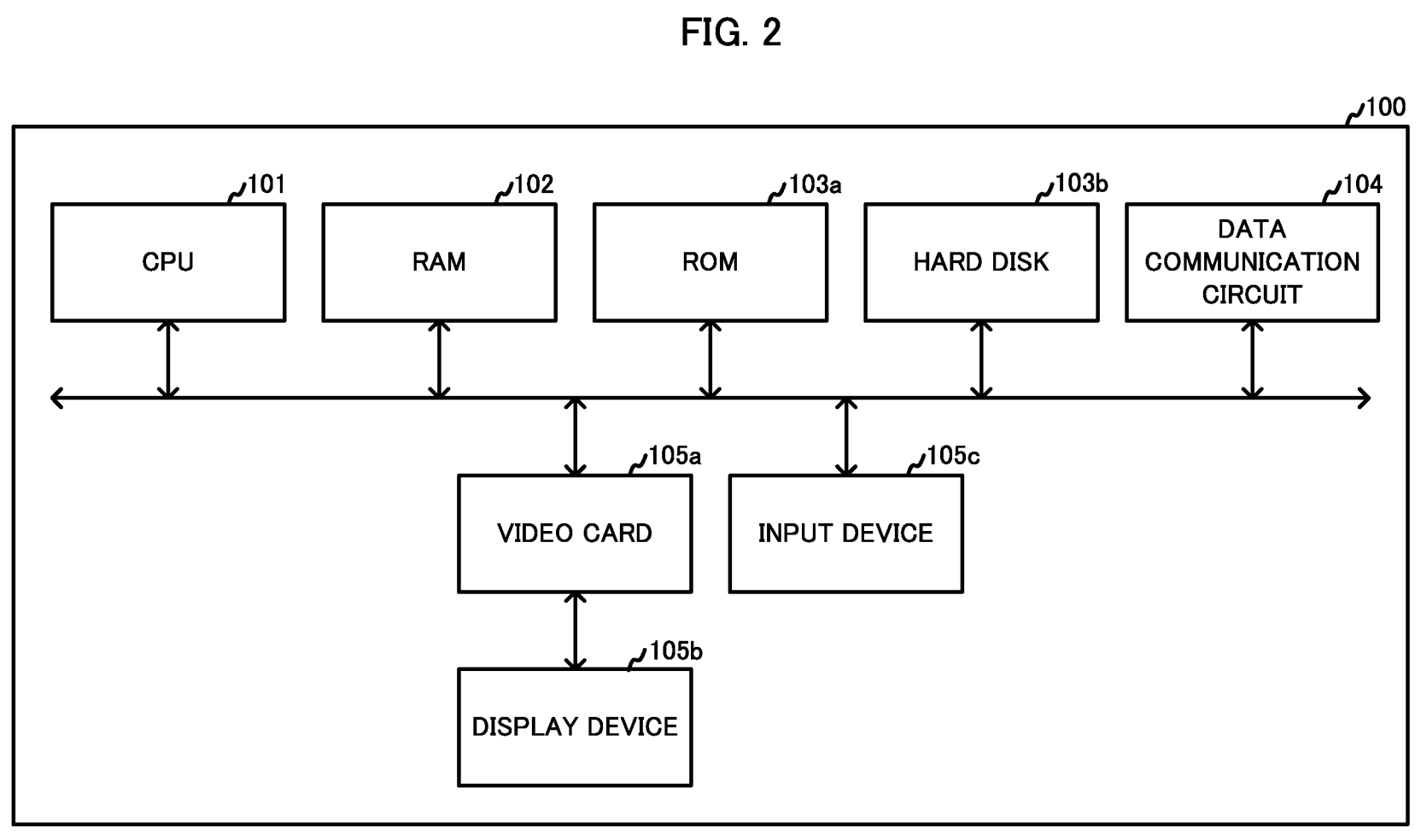

| 101 | 102 | 103a | 103b | 104 |
|-----|-----|------|------|-----|
| CPU | RAM | ROM | HARD DISK | DATA COMMUNICATION CIRCUIT |

105a VIDEO CARD

105b DISPLAY DEVICE

105c INPUT DEVICE

ITEM TABLE

| ITEM ID | NAME | PREPARATION TIME | LONGEST ALLOWABLE TIME | TOTAL TIME |
|---------|------|------------------|------------------------|------------|
| G01 | TOMATO | 5 MIN | 30 MIN | 35 MIN |
| G02 | BREAD | 5 MIN | 30 MIN | 35 MIN |
| G03 | HAMBURGER | 15 MIN | 10 MIN | 25 MIN |
| G04 | RAMEN NOODLES | 15 MIN | 5 MIN | 20 MIN |
| G05 | STEAK | 30 MIN | 5 MIN | 35 MIN |
| ... | ... | ... | ... | ... |

Figure 10:
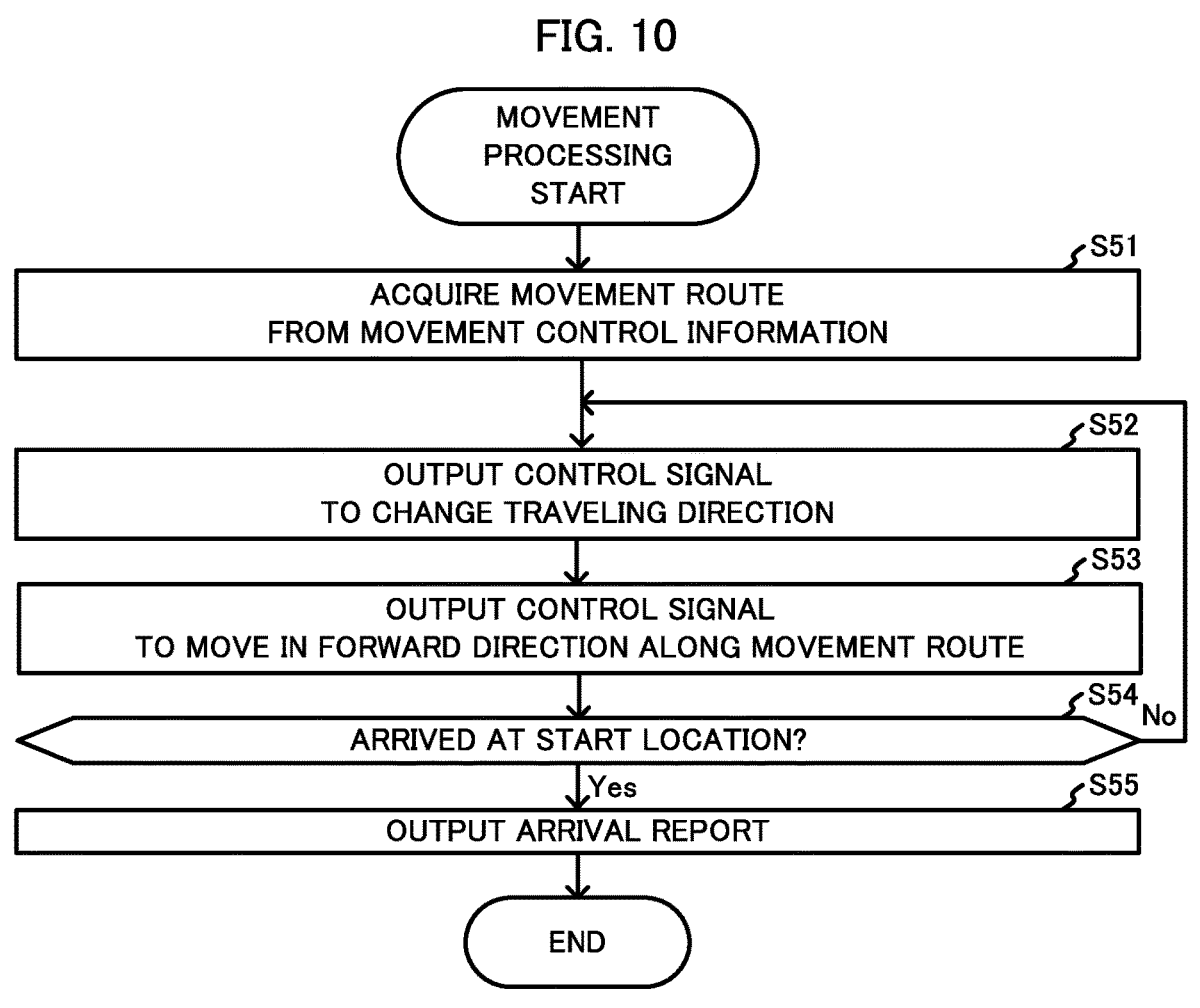

MOVEMENT
PROCESSING
START

S51
ACQUIRE MOVEMENT ROUTE
FROM MOVEMENT CONTROL INFORMATION

S52
OUTPUT CONTROL SIGNAL
TO CHANGE TRAVELING DIRECTION

S53
OUTPUT CONTROL SIGNAL
TO MOVE IN FORWARD DIRECTION ALONG MOVEMENT ROUTE

S54   No
ARRIVED AT START LOCATION?

Yes    S55
OUTPUT ARRIVAL REPORT

END

CONTROL DEVICE, SYSTEM, AND METHOD

CROSS REFERENCE TO RELATED APPLICATIONS

This application is a National Stage of International Application No. PCT/JP2021/007451, filed Feb. 26, 2021.

TECHNICAL FIELD

The present disclosure relates to a control device, a system, and a method.

BACKGROUND ART

Conventionally, systems that, when an order is accepted, cause a vehicle, including a delivery robot, to transport a commercial item targeted by the order have been known (see, for example, Patent Literature 1).

CITATION LIST

Patent Literature

Patent Literature 1: Unexamined Japanese Patent Application Publication No. 2018-151923

SUMMARY OF INVENTION

Technical Problem

However, a system described in Patent Literature 1 has generated movement control information for causing a vehicle to move to a start location of transportation regardless of preparation time required for preparation of an ordered item or a preparation completion time at which the preparation is completed and the amount of energy that the vehicle is estimated to consume to move to a location at which transportation of the item is started. Thus, despite being unable to start transportation until preparation time elapses or a preparation completion time arrives, the system has caused a vehicle to move to the start location of transportation before the preparation time elapses or the preparation completion time arrives while, for example, increasing the amount of consumption of energy. Therefore, there has been a problem in that the system described in Patent Literature 1 is incapable of generating movement control information that, while suppressing a delay in the start of transportation, suppresses an increase in the amount of energy that the vehicle consumes to move to the start location of transportation.

The present disclosure has been made in consideration of the above-described problem, and an objective of the present disclosure is to provide a control device, a system, and a method that are capable of generating movement control information that, while suppressing a delay in start of transportation, suppresses an increase in the amount of energy that a vehicle consumes to move to a start location of transportation.

Solution to Problem

In order to achieve the above-described objective, a control device according to a first aspect of the present disclosure includes:

an acquirer that, when an order is accepted, acquires vehicle location information indicating a location of a vehicle capable of storing a target of the order, start location information indicating a start location at which transportation of the target is started, and preparation information indicating preparation time required for preparation to bring a state of the target into a state where the transportation is startable or a preparation completion time at which the preparation is completed; and a generator that generates movement control information for causing the vehicle to move from the location of the vehicle to the start location, based on (i) an amount of energy that the vehicle is estimated to consume to move from the location indicated by the acquired vehicle location information to the start location indicated by the acquired start location information, and (ii) the preparation time or the preparation completion time indicated by the acquired preparation information.

Advantageous Effects of Invention

According to a control device, a system, and a method according to the present disclosure, it is possible to generate movement control information that, while suppressing a delay in start of transportation, suppresses an increase in the amount of energy that a vehicle consumes to move to a start location of transportation.

BRIEF DESCRIPTION OF DRAWINGS

FIG. 1 is a system configuration diagram illustrating a configuration example of a transportation system according to the present disclosure;

FIG. 2 is a hardware configuration diagram illustrating a configuration example of a control device:

FIG. 4 is a functional block diagram illustrating an example of functions that the control device has:

FIG. 5 is a diagram illustrating an example of an item table that the control device stores:

FIG. 10 is a flowchart illustrating an example of movement processing that the vehicle executes.

DESCRIPTION OF EMBODIMENTS

Embodiment 1

Figure 3:
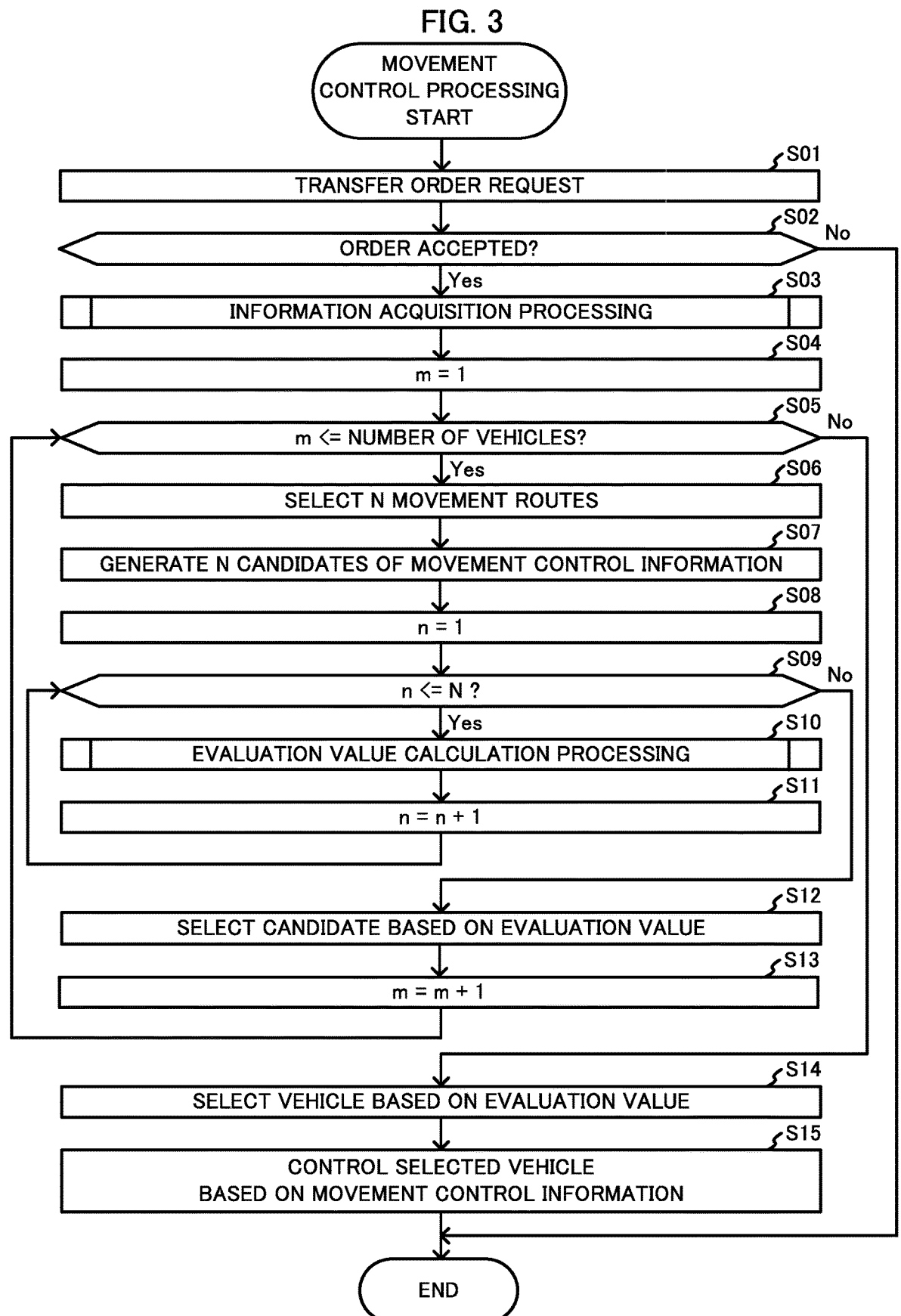
FIG. 3 is a flowchart illustrating an example of movement control processing that the control device executes.

Hereinafter, an embodiment of the present disclosure is described with reference to the drawings.

Figure 1:
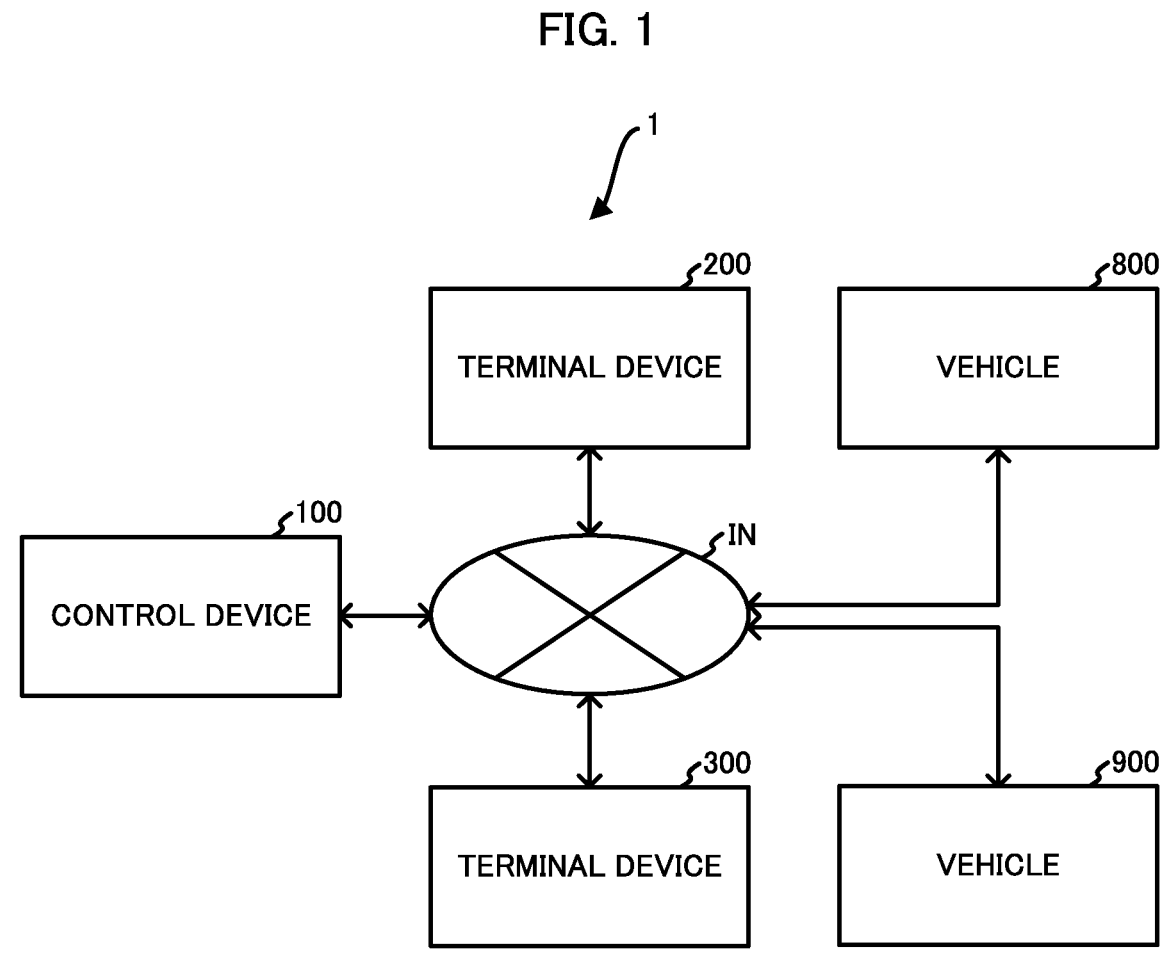

A transportation system 1 according to Embodiment 1 of the present disclosure includes a control device 100 as illustrated in FIG. 1 to control transportation of a commercial item (hereinafter, referred to as an item) targeted by an order. The transportation system 1 also includes a terminal device 200 carried by an orderer who makes an order of an item and a terminal device 300 installed in a store that sells an item. The transportation system 1 further includes vehicles 800 and 900 to, in order to transport an item sold by a store to a transportation destination specified by an orderer, store the item and move in accordance with control by the control device 100.

The control device 100 is a server machine and is installed in, for example, an office building of a broker that mediates sale of an item. The control device 100 includes a central processing unit (CPU) 101, a random access memory (RAM) 102, a read only memory (ROM) 103a, a hard disk 103b, a data communication circuit 104, a video card 105a, a display device 105b, and an input device 105c, which are hardware components, as illustrated in FIG. 2. The control device 100 may include a plurality of CPUs and may include a plurality of RAMs and flash memories.

The CPU 101 of the control device 100 performs overall control of the control device 100 by executing programs stored in the ROM 103a or the hard disk 103b. The RAM 102 temporarily stores data to be processed at the times of execution of the programs by the CPU 101. The ROM 103a and the hard disk 103b store various types of programs, various types of data used in execution of the various types of programs, and tables in which data are stored.

The data communication circuit 104 of the control device 100 is a network interface card (NIC) and, in accordance with a communication standard, including, for example, long term evolution (LTE) and 5th generation (5G), performs data communication with a not-illustrated base station that is connected to the Internet IN, using radio waves. Because of this configuration, the data communication circuit 104 of the control device 100 performs data communication with the terminal devices 200 and 300 and the vehicles 800 and 900, which are connected to the Internet IN.

The video card 105a of the control device 100 renders images, based on digital signals output from the CPU 101 and also outputs image signals that represent the rendered images. The display device 105b is an electroluminescence (EL) display, a plasma display panel (PDP), or a liquid crystal display (LCD) and displays images in accordance with the image signals output from the video card 105a. The input device 105c is one or more of a keyboard, a mouse, a touch pad, and a button and inputs a signal corresponding to an operation by an employee of a broker.

When the data communication circuit 104 of the control device 100 receives an order request requesting acceptance of an order of an item from the terminal device 200 of an orderer, the control device 100 performs movement control processing, as illustrated in FIG. 3, of performing control to cause the vehicle 800 or 900 to move to a start location at which transportation of the item is to be started.

Although, in the present embodiment, an item is food and drink and the start location of transportation is a location of an entrance to a store that sells ordered food and drink, the present embodiment is not limited thereto.

Figure 4:
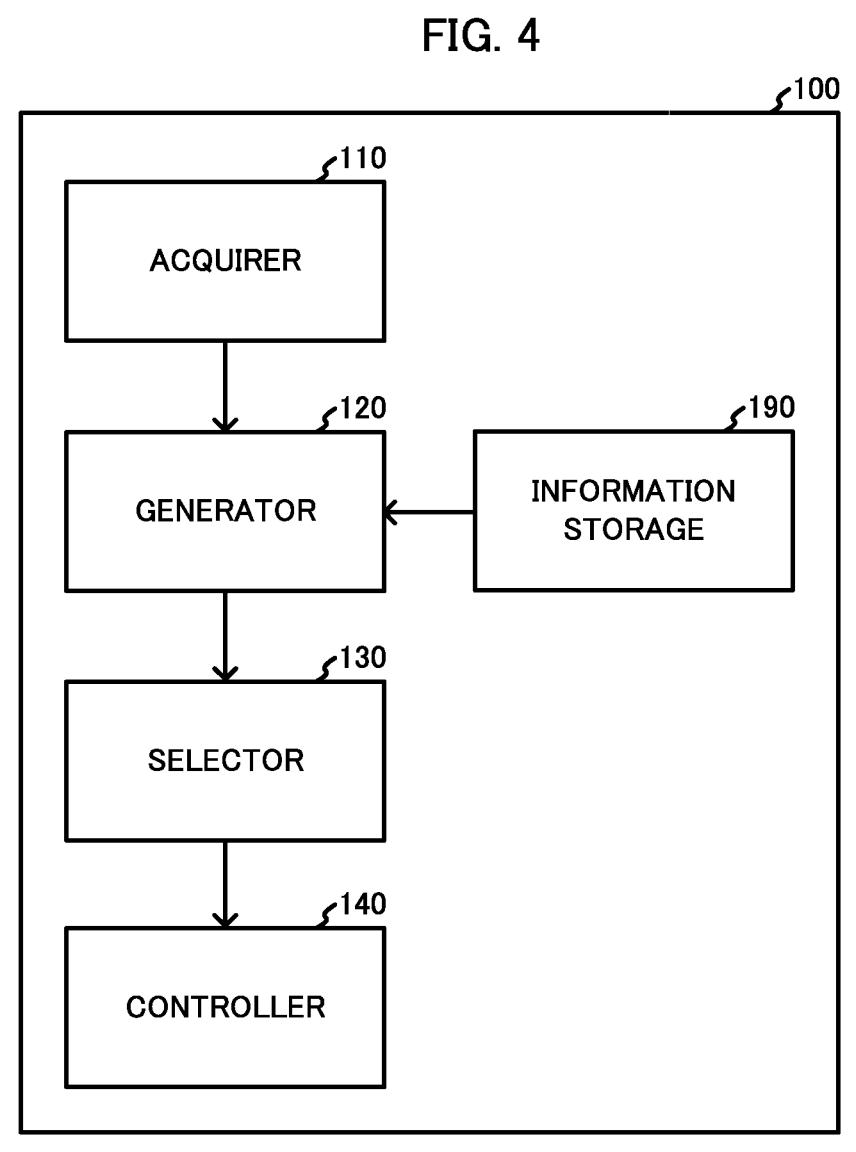

In the execution of the movement control processing, the CPU 101 of the control device 100 functions as an acquirer 110, as illustrated in FIG. 4, that, when an order is accepted, acquires vehicle location information indicating a location of the vehicle 800, vehicle location information indicating a location of the vehicle 900, start location information indicating the start location of transportation, and preparation information indicating preparation time required for preparation to bring a state of an item targeted by the order to a state where transportation is startable.

In the present embodiment, when an item needs to be cooked before start of delivery of the item, the state of the item where transportation is startable includes a state where the item has been cooked. In addition, when an item needs to be packaged before start of delivery of the item, the state of the item where transportation is startable includes a state where the item has been packaged. Existence or nonexistence of necessity to be cooked and existence or nonexistence of necessity to be packaged are agreed explicitly or implicitly between an orderer and an employee of a store at the time of acceptance of an order of the item or are determined in advance in commercial practice. In addition, the state of an item where transportation is startable includes a state where the item is located at a start location of transportation.

Because of these conditions, in the case of an item that needs neither to be cooked nor packaged, preparation to bring the state of the item into a state where transportation is startable includes, for example, searching for the item from a shelf in a warehouse and transferring the found item to the start location of transportation. Thus, the preparation time includes search time required to search for the item and start location transfer time required to transfer the found item to the start location.

In addition, in the case of an item that, although not necessary to be cooked, needs to be packaged, the preparation of the item includes searching for the item, packaging the item, and transferring the item to the start location. Thus, the preparation time of the item includes the sum of search time required to search for the item, packaging time required to package the found item, and start location transfer time of the packaged item.

Further, in the case of an item that needs to be cooked and packaged, the preparation of the item includes cooking the item, packaging the cooked item, and transferring the packaged item to the start location. Thus, the preparation time of the item includes the sum of cooking time required to cook the item, packaging time required to package the cooked item, and start location transfer time of the packaged item.

The CPU 101 of the control device 100 further functions as a generator 120 that generates movement control information of the vehicle 800. The generator 120 generates the movement control information based on the preparation time of an item for which an order has been accepted and the amount of energy that the vehicle 800, which is capable of storing the item, is estimated to consume to move from the location of the vehicle 800 to the start location of transportation. The amount of energy that the vehicle 800 consumes is estimated by the generator 120. In addition, the movement control information of the vehicle 800 is information for causing the vehicle 800 to move from the location of the vehicle 800 to the start location of transportation.

The generator 120 of the control device 100 likewise estimates the amount of energy that the vehicle 900 consumes to move from the location of the vehicle 900 to the start location of transportation and, based on the estimated amount of energy and the preparation time of the item, generates movement control information of the vehicle 900.

The CPU 101 of the control device 100 also functions as a selector 130 that, based on an evaluation value of the movement control information of the vehicle 800 and an evaluation value of the movement control information of the vehicle 900, which are generated by the generator 120, selects a vehicle that is caused to transport an ordered item from among the vehicles 800 and 900.

Since, in the present embodiment, the evaluation value of the movement control information of the vehicle 800 is an index indicating to what extent the movement control information is appropriate, the more appropriate the movement control information is, the higher the evaluation value of the movement control information is determined to be. In addition, in the present embodiment, the smaller is the amount of energy that is estimated to be consumed by the vehicle 800 when the vehicle 800 moves based on the movement control information, the more appropriate the movement control information is and, thus, the higher the evaluation value of the movement control information is determined to be. The same applies to the evaluation value of the movement control information of the vehicle 900.

The CPU 101 of the control device 100 further functions as a controller 140 that performs, on the selected vehicle 800 or 900, control to cause the vehicle 800 or 900 to move from the location of the vehicle 800 or 900 to the start location of transportation, based on the movement control information.

Further, the hard disk 103b of the control device 100 functions as an information storage 190 that stores information used in the execution of the movement control processing. The information storage 190 stores in advance an item table, as illustrated in FIG. 5, in which information about items is stored in advance.

In the item table, a plurality of records is stored in advance. In each record in the item table, an item identification (ID) identifying an item, information indicating a name of the item, preparation information indication preparation time of the item, information indicating a longest time that is allowed as a period from when preparation of the item is completed to when transportation of the item is started (hereinafter, referred to as a longest allowable time), and total information indicating total time of the preparation time and the longest allowable time of the item are associated with one another and stored in advance.

In the present embodiment, items include tomatoes, bread, a hamburger, ramen noodles, and steak. In addition, in the present embodiment, although preparation to bring the state of tomatoes or bread into a state where transportation is startable does not include cooking, preparation to bring the state of steak, ramen noodles, or a hamburger into a state where transportation is startable includes cooking. Because of these conditions, preparation time of tomatoes or bread is set shorter than preparation time of a hamburger, ramen noodles, or steak in advance.

In addition, in the present embodiment, the longest allowable time is set in advance according to a property of an item to be transported, and the property of an item includes a property that the state of the item changes as time passes. For example, the property of ramen noodles includes a property that noodles get soft as time passes. Noodles getting soft means that the state of noodles changes from a state where the noodles contain an amount of water per unit length less than a predetermined amount of water per unit length to a state where the noodles contain an amount of water per unit length greater than or equal to the predetermined amount of water per unit length. Thus, the longest allowable time of ramen noodles is set in advance to a value less than or equal to the longest allowable time for transportation of an item that does not have a property of noodles getting soft, such as tomatoes, bread, a hamburger, and steak.

In addition, for example, the property of a hamburger, ramen noodles, or steak includes necessity of cooking to increase temperature of the item to a temperature higher than a predetermined temperature (hereinafter, referred to as necessity of heating cooking) and a property that the temperature of the item, which was increased to a higher temperature than the predetermined temperature by cooking, decreases to a temperature lower than or equal to the predetermined temperature as time passes (hereinafter, referred to as a cooling property). Thus, the longest allowable time of a hamburger, ramen noodles, or steak is set in advance to a value less than or equal to the longest allowable time for transportation of an item that has neither necessity of heating cooking nor the cooling property, such as tomatoes and bread.

An item and a property of the item are not limited to the above description. The item may be soup served cold or ice cream, and the property of an item may include necessity of cooking or storage to decrease temperature of the item to a temperature lower than a predetermined temperature (hereinafter, referred to as necessity of cooling cooking or storage) and a property that the temperature of the item, which was decreased to a lower temperature than the predetermined temperature, increases to a temperature higher than or equal to the predetermined temperature as time passes (hereinafter, referred to as a warming property).

When the execution of the movement control processing in FIG. 3 is started, the acquirer 110 of the control device 100 acquires an order request received from the terminal device 200 of the orderer from the data communication circuit 104 and outputs the acquired order request to the data communication circuit 104 with the terminal device 300 of the store as the destination. Through this processing, the order request is transferred to the store (step S01).

When the data communication circuit 104 of the control device 100 has not received an acceptance notification notifying that the order is accepted by the store from the terminal device 300 of the store before a predetermined period has elapsed since the order request was transferred, the acquirer 110 determines that the order is not accepted (step S02: No). Subsequently, the acquirer 110 outputs a non-acceptance notification notifying that the order is not accepted to the data communication circuit 104 with the terminal device 200 of the orderer as the destination, and thereafter terminates the execution of the movement control processing.

Figure 6:
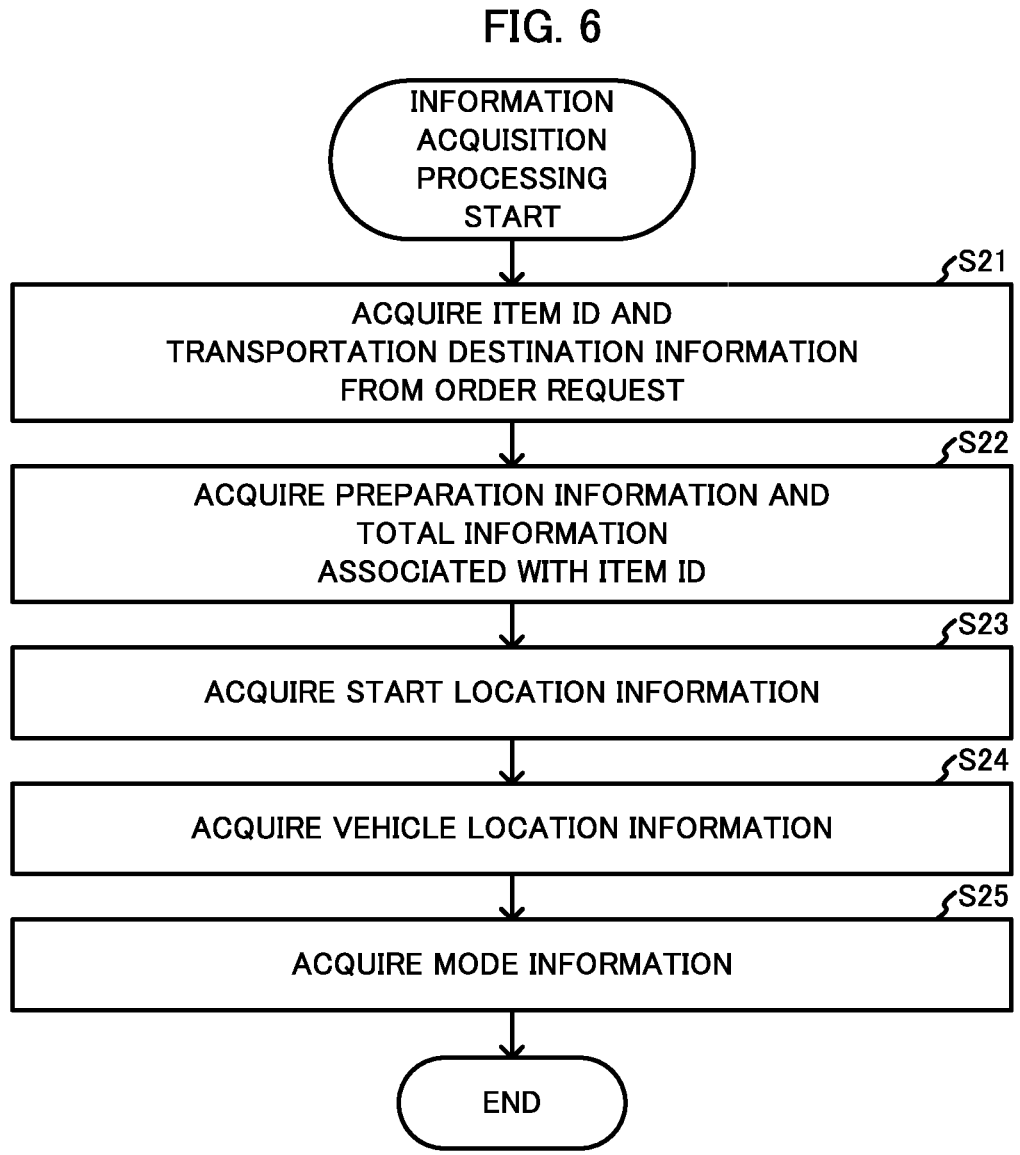
FIG. 6 is a flowchart illustrating an example of information acquisition processing that the control device executes.

In contrast, when an acceptance notification is received before the predetermined period has elapsed since the order request was transferred, the acquirer 110 of the control device 100 determines that the order is accepted (step S02: Yes). Next, the acquirer 110 executes information acquisition processing of acquiring information about the ordered item as illustrated in FIG. 6 (step S03).

When the acquirer 110 of the control device 100 starts the execution of the information acquisition processing, the acquirer 110 acquires the item ID of the ordered item and information indicating a transportation destination of the item in an address from the order request acquired in step S01 in FIG. 3 (step S21). Next, the acquirer 110, by acquiring information indicating latitude, longitude, and altitude that the information storage 190 stores in advance in association with the information indicating the address of the transportation destination, acquires transportation destination information indicating a location of the transportation destination in latitude, longitude, and altitude.

Although, in the present embodiment, the acquirer 110 of the control device 100 subsequently acquires preparation information and total information associated with the acquired item ID in the item table in FIG. 5 (step S22), the present embodiment is not limited thereto. The acquirer 110 may acquire total information indicating total time by acquiring preparation information and information indicating longest allowable time associated with the item ID and summing longest allowable time indicated by the acquired information and preparation time indicated by the acquired preparation information.

Subsequently, the acquirer 110 of the control device 100 acquires start location information that is information that the information storage 190 stores in advance and that indicates the start location of transportation in latitude, longitude, and altitude (step S23).

Next, the acquirer 110 of the control device 100 outputs a send request requesting sending of vehicle location information indicating the location of the vehicle 800 in latitude, longitude, and altitude, to the data communication circuit 104 with the vehicle 800 as the destination. When the data communication circuit 104 of the control device 100, after having sent the send request to the vehicle 800, receives vehicle location information, the acquirer 110 acquires the vehicle location information of the vehicle 800 from the data communication circuit 104. Likewise, the acquirer 110 acquires vehicle location information of the vehicle 900 (step S24).

Subsequently, the acquirer 110 of the control device 100 acquires mode information that the information storage 190 stores in advance (step S25) and thereafter terminates the execution of the information acquisition processing.

In the present embodiment, the mode information is information indicating an operation mode that represents actions taken by the vehicle 800 or 900 when the vehicle 800 or 900, with an item stored therein, moves from the location of the vehicle 800 or 900 to the start location of transportation. In the present embodiment, the mode information that the information storage 190 has stored in advance indicates a standard mode in which a predetermined standard velocity is set to the vehicle 800 or 900 as movement velocity of the vehicle 800 or 900 at the time of movement. Although, in the present embodiment, the movement velocity of the vehicle 800 or 900 to be set is an average velocity of the vehicle 800 or 900, the present embodiment is not limited thereto, and the movement velocity may be a maximum velocity or a velocity limit of the vehicle 800 or 900.

After the information acquisition processing has been executed in step S03 in FIG. 3, the generator 120 of the control device 100 initializes a variable m identifying the vehicle 800 or 900 with a number of 1, which identifies the vehicle 800 (step S04). Next, the generator 120 determines that a value of 1 of the variable m is less than or equal to a value of 2, which is the number of vehicles that the transportation system 1 includes (step S05: Yes).

Subsequently, the generator 120 of the control device 100 searches for a plurality of routes starting from the location of the vehicle 800 that is identified by the variable m, and reaching the start location of transportation. Then, the generator 120 selects, from among a plurality of found routes, N (where N is a natural number) routes each of which, when the vehicle 800 moves at the standard velocity, requires movement time greater than or equal to the preparation time and less than or equal to the total time for the vehicle 800 to pass through the route, as movement routes of the vehicle 800 (step S06).

For this purpose, the acquirer 110 of the control device 100 reads a plurality of records from a partial route table, which the information storage 190 stores in advance. In each of a plurality of records in the partial route table, information relating to a partial route, such as a road and a sidewalk, along which the vehicles 800 and 900 can move is stored.

The information relating to a partial route is information in which latitude, longitude, and altitude of the start node of an edge, which is a partial route, latitude, longitude, and altitude of the end node of the edge, and information indicating length of the edge are associated with one another.

Next, the generator 120 of the control device 100 executes a well-known route search algorithm, such as Dijkstra's algorithm, using lengths of edges and latitudes, longitudes, and altitudes of the start nodes and the end nodes of the edges, which are stored in the respective read records in the partial route table, latitude, longitude, and altitude indicating the location of the vehicle 800, and latitude, longitude, and altitude indicating the start location of transportation. Through this processing, the generator 120, by combining partial routes, searches for a plurality of entire routes starting from the location of the vehicle 800 and reaching the start location.

Next, the generator 120 of the control device 100, with respect to each of the plurality of found entire routes, calculates total distance and, based on the calculated distance and the standard velocity, calculates movement time required for the vehicle 800 moving in the standard mode to pass through the entire route.

Next, the generator 120 of the control device 100 selects, from among the plurality of found entire routes, N entire routes the calculated movement time of each of which is greater than or equal to the preparation time and less than or equal to the total time, as movement routes. Although, in the present embodiment, the generator 120 selects N entire routes in ascending order of movement time, the present embodiment is not limited thereto. The generator 120 may select N entire routes, based on, for example, a predetermined rule other than the ascending order of movement time or software-generated random numbers.

Subsequently, the generator 120 of the control device 100 assigns numbers of 1 to N, which indicate the first to the N-th, respectively, to the N movement routes, based on, for example, a predetermined rule, including order of selection, or software-generated random numbers. Next, the generator 120 generates a first candidate of the movement control information of the vehicle 800 including information indicating the first movement route. Likewise, the generator 120 generates second to N-th candidates of the movement control information of the vehicle 800 (step S07). In the present embodiment, in information indicating a movement route, information indicating the locations of nodes included in the movement route in latitude, longitude, and altitude and information indicating a visiting sequence of the nodes are included.

The generator 120 of the control device 100 initializes a variable n identifying a candidate of the movement control information with a number of 1, which identifies the first candidate (step S08). Next, the generator 120 determines that a value of 1 of the variable n is less than or equal to N, which is the number of candidates (step S09; Yes), and executes evaluation value calculation processing, as illustrated in FIG. 7, of calculating an evaluation value indicating to what extent a candidate identified by the variable n is appropriate as movement control information (step S10).

Figure 7:
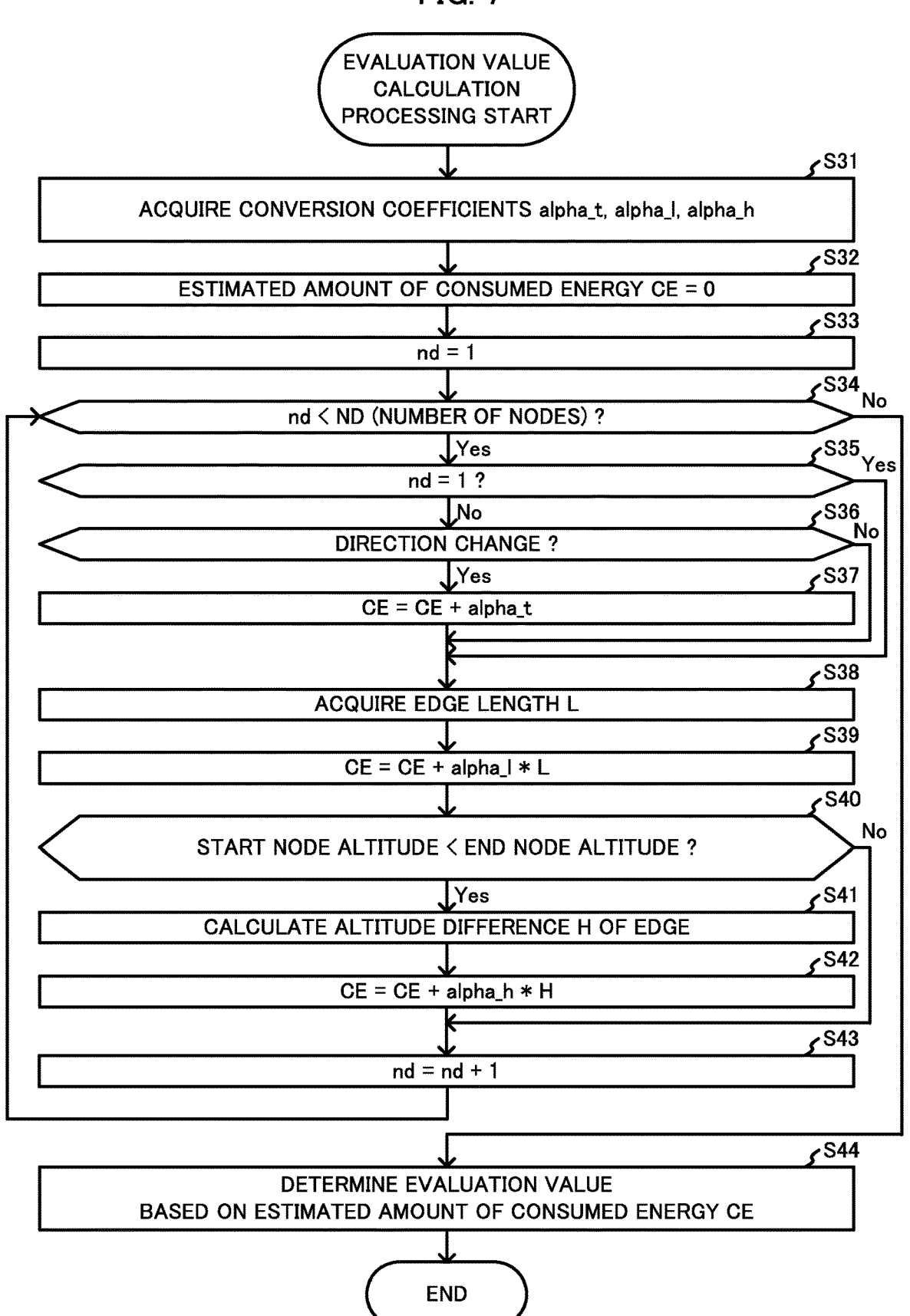
FIG. 7 is a flowchart illustrating an example of evaluation value calculation processing that the control device executes.

When the execution of the evaluation value calculation processing in FIG. 7 is started, the acquirer 110 of the control device 100 acquires conversion coefficients alpha_t, alpha_l, and alpha_h, which the information storage 190 stores in advance (step S31).

The conversion coefficient alpha_t is a coefficient to convert the number of times that the vehicle 800 changes traveling direction to the amount of energy that the vehicle 800 is estimated to consume in order to change traveling direction the number of times. In addition, the conversion coefficient alpha_l is a coefficient to convert distance that the vehicle 800 moves to the amount of energy that the vehicle 800 is estimated to consume in order to move the distance. Further, the conversion coefficient alpha_h is a coefficient to convert the amount of change in traveling altitude of the vehicle 800 to the amount of energy that the vehicle 800 is estimated to consume in order to change the traveling altitude of the vehicle 800 by the amount of change.

Next, the generator 120 of the control device 100 initializes a variable CE indicating the estimated amount of consumed energy of the vehicle 800 with a value of 0 (step S32). The estimated amount of consumed energy of the vehicle 800 indicated by the variable CE is the amount of energy that is estimated to be consumed by the vehicle 800 in order for the vehicle 800 to move along a movement route included in a candidate identified by the variable n.

Subsequently, the generator 120 of the control device 100 assigns numbers of 1 to ND (where ND is a natural number), which indicate the first to the ND-th, respectively, to a plurality of nodes included in the movement route in the order of the visiting sequence. Subsequently, the generator 120 initializes a variable nd identifying a node with a number of 1, which identifies the first node (step S33).

Next, the generator 120 of the control device 100 determines that a value of 1 of the variable nd is less than ND, which is the number of nodes (step S34: Yes). Subsequently, since the value of the variable nd is 1 (step S35: Yes), the generator 120 determines that a node identified by the variable nd is the first node. Thus, the generator 120 determines that an edge having the node as the starting point (hereinafter, referred to as an edge succeeding the node) exists and no edge having the node as the end point (hereinafter, referred to as an edge preceding the node) exists. Since there exists no edge preceding the node, the generator 120 determines that the vehicle 800 does not have to change the traveling direction at the node in order to move from the edge preceding the node to the edge succeeding the node.

Next, the acquirer 110 of the control device 100 acquires length L of the edge succeeding the node, which has the node as the start node and a node succeeding the node as the end node (step S38). For this purpose, the acquirer 110 acquires length L associated with latitude, longitude, and altitude of the start node and latitude, longitude, and altitude of the end node from the not-illustrated partial route table. In the present embodiment, a node succeeding a node identified by the variable nd means a node identified by a value obtained by adding 1 to the value of the variable nd.

Subsequently, the generator 120 of the control device 100, by multiplying the acquired length L of the edge by the conversion coefficient alpha_l read in step S31, estimates the amount of energy consumed by the vehicle 800 in order for the vehicle 800 to move the length L to be alpha_l*L. Next, the generator 120 adds the estimated amount of energy alpha_l*L to the variable CE, which indicates the estimated amount of consumed energy of the vehicle 800 (step S39).

Next, the generator 120 of the control device 100 determines whether or not the edge is an ascending slope, based on whether or not the altitude of the start node is lower than the altitude of the end node (step S40). On this occasion, when the generator 120 determines that the edge is an ascending slope because the altitude of the start node is lower than the altitude of the end node (step S40; Yes), the generator 120 calculates an altitude difference H between the altitude of the start node and the altitude of the end node (step S41). Subsequently, the generator 120, by multiplying the calculated altitude difference H by the conversion coefficient alpha_h read in step S31, estimates the amount of energy consumed by the vehicle 800 in order to change the traveling altitude of the vehicle 800 by the altitude difference H to be alpha_h*H. Next, the generator 120 adds the estimated amount of energy alpha_h*H to the variable CE (step S42).

When the generator 120 of the control device 100 determines that the edge is not an ascending slope because the altitude of the start node is greater than or equal to the altitude of the end node, in step S40 (step S40; No), or after the generator 120 has executed the processing in step S42, the generator 120, by incrementing the value of the variable nd by one, updates the value of the variable nd to a value of 2 (step S43) and thereafter executes the processing in step S34 again.

On this occasion, the generator 120 of the control device 100 determines that a value of 2 of the variable nd is less than ND, which is the number of nodes (step S34: Yes). Next, since the value of the variable nd is not 1 but 2 (step S35; No), the generator 120 determines that a node identified by the variable nd is not the first node. Thus, the generator 120 determines that there is a case where the vehicle 800 needs to change the traveling direction at the node in order to move from the edge preceding the node to the edge succeeding the node.

Next, the generator 120 of the control device 100 calculates a vector pointing to a node identified by the variable nd from a node preceding the node and a vector pointing from the node identified by the variable nd to a node succeeding the node by use of latitudes, longitudes, and altitudes of the three nodes. In the present embodiment, a node preceding a node identified by the variable nd means a node identified by a value obtained by subtracting 1 from the value of the variable nd. Subsequently, the generator 120, based on the two calculated vectors, calculates an angle by which the vehicle 800 changes the traveling direction in order to move from the edge preceding the node identified by the variable nd to the edge succeeding the node.

Subsequently, when the calculated angle is smaller than a set angle indicated by a variable stored in advance in the information storage 190, the generator 120 of the control device 100 determines that the traveling direction is not to be changed (step S36; No). Next, the generator 120 executes the processing in steps S38 to S43 and thereafter repeats the above-described process from step S34.

In contrast, when the calculated angle is greater than or equal to the set angle, the generator 120 of the control device 100 determines that the traveling direction is to be changed (step S36: Yes). Next, the generator 120, by multiplying the number of changes in the traveling direction, which is 1, by the conversion coefficient alpha_t read in step S31, estimates the amount of energy consumed by the vehicle 800 in order for the vehicle 800 to change the traveling direction once to be alpha_t. Next, the generator 120, after adding the estimated amount of energy, which is alpha_t, to the variable CE (step S37), executes the processing in steps S38 to S43 and thereafter repeats the above-described process from step S34.

When, in step S34, the generator 120 of the control device 100 determines that the value of the variable nd is greater than or equal to ND, which is the number of nodes (step S34; No), the generator 120 determines an evaluation value of the candidate identified by the variable nd, based on the value of the variable CE, which indicates the estimated amount of consumed energy of the vehicle 800 (step S44). Although, in the present embodiment, the generator 120, by, for example, determining the inverse of the variable CE as an evaluation value, determines an evaluation value in such a manner that the smaller the amount of energy that is estimated to be consumed by the vehicle 800 is, the higher the evaluation value becomes, the method for determining an evaluation value is not limited thereto. Subsequently, the generator 120 terminates the execution of the evaluation value calculation processing.

After the evaluation value calculation processing has been executed in step S10 in FIG. 3, the generator 120 of the control device 100 increments the value of the variable n, which identifies a candidate of the movement control information, by one (step S11) and thereafter repeats the above-described process from step S09.

When, in step S09, the generator 120 of the control device 100 determines that the value of the variable n is greater than N, which is the number of candidates (step S09; No), the generator 120, by selecting a candidate from among the N candidates, based on the evaluation values determined in step S10 (step S12), generates movement control information of the vehicle 800. In the present embodiment, the generator 120 selects a candidate for which a highest evaluation value is determined as the movement control information of the vehicle 800. Subsequently, the generator 120 determines the same value as the evaluation value used for generation of the movement control information as an evaluation value of the generated movement control information. The evaluation value used for generation of the movement control information means the evaluation value of the candidate selected in step S12.

In this way, the generator 120 of the control device 100, by generating N candidates of the vehicle 800, determining an evaluation value for each of the N generated candidates, and, based on the determined evaluation values, selecting a candidate from among the N candidates, generates the movement control information of the vehicle 800.

Subsequently, the generator 120 of the control device 100, by incrementing the value of the variable m by one, updates the value of the variable m to a value of 2, which identifies the vehicle 900 (step S13). Next, the control device 100, after executing the processing in steps S05 to S13, executes the processing in step S05 again. Through this processing, the generator 120 generates movement control information of the vehicle 900 and determines an evaluation value of the generated movement control information.

Subsequently, when, in step S05, the selector 130 of the control device 100 determines that the value of the variable m is greater than 2, which is the number of vehicles (step S05: No), the selector 130, based on the evaluation value of the movement control information of the vehicle 800 and the evaluation value of the movement control information of the vehicle 900, selects either the vehicle 800 or 900 as a vehicle to be caused to transport the ordered item (step S14).

In the present embodiment, when the evaluation value of the movement control information of the vehicle 800 is greater than or equal to the evaluation value of the movement control information of the vehicle 900, the selector 130 of the control device 100 selects the vehicle 800. In contrast, when the evaluation value of the movement control information of the vehicle 800 is less than the evaluation value of the movement control information of the vehicle 900, the selector 130 selects the vehicle 900.

Subsequently, the controller 140 of the control device 100 outputs the movement control information of the vehicle 800 or 900 to the data communication circuit 104 with the selected delivery vehicle 800 or 900 as the destination.

Through this processing, the controller 140 performs, on the vehicle 800 or 900, control to cause the vehicle 800 or 900 to move from the location of the vehicle 800 or 900 to the start location of transportation, based on the movement control information of the vehicle 800 or 900 (step S15). Subsequently, the controller 140 terminates the execution of the movement control processing.

The terminal device 200 that an orderer of an item carries and the terminal device 300 of a store at which sale of the item is performed are, for example, smartphones or tablet-type or laptop-type personal computers. The terminal device 200 of the orderer sends an order request to the control device 100 in accordance with operation by the orderer. When the terminal device 300 of the store receives the order request transferred by the control device 100, the terminal device 300 displays the received order request. When an employee of the store visually recognizes the displayed order request, the employee performs, on the terminal device 300, an operation to cause the terminal device 300 to send an acceptance notification notifying that the order is accepted. Subsequently, the employee starts preparation to bring the state of the ordered item into a state of being transportable.

Figure 8:
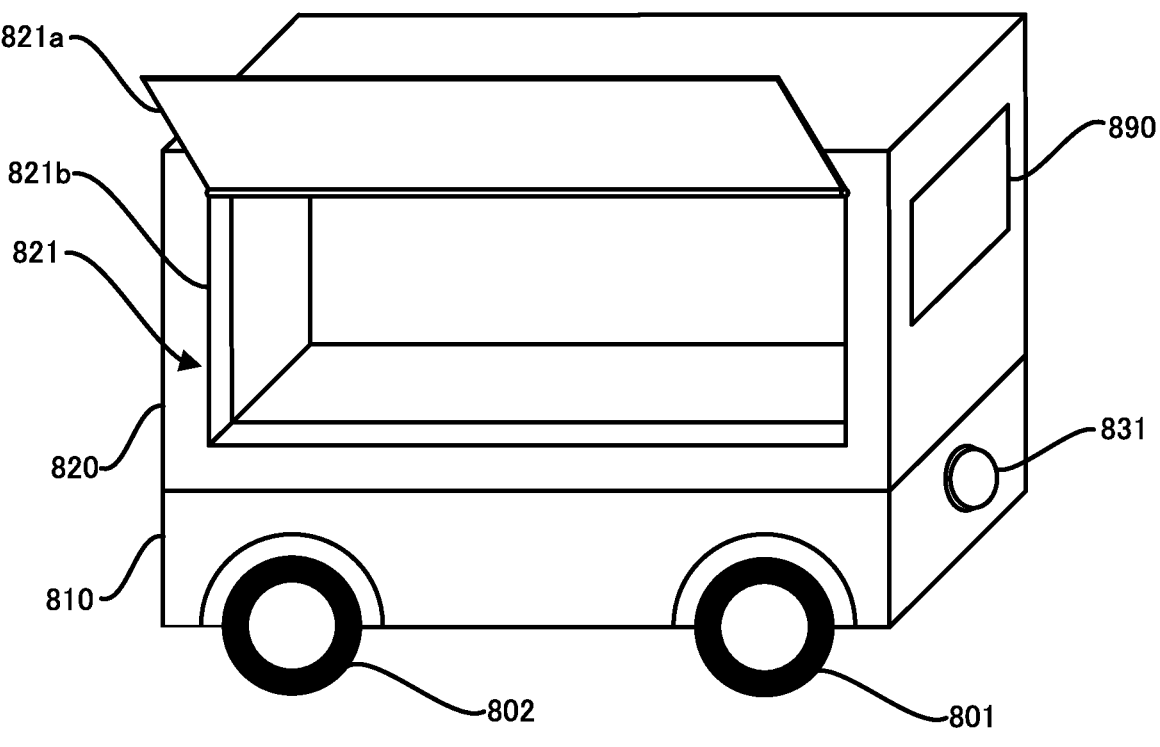
FIG. 8 is an appearance configuration diagram illustrating an appearance example of a vehicle according to Embodiment 1.

The vehicle 800 is an unmanned ground vehicle as illustrated in FIG. 8 and has parked or has come to a stop at a predetermined parking spot. The vehicle 800 includes a chassis 810 provided with a plurality of wheels including wheels 801 and 802, a storage cabinet 820 installed on the upper surface of the chassis 810, and a control device 890 built into the storage cabinet 820.

The storage cabinet 820 of the vehicle 800 includes a storage box 821 capable of storing an item. The storage box 821 includes a not-illustrated bottom plate, ceiling plate, and back plate and not-illustrated two side plates and includes a box body that is closed by the plates and that forms a space the front of which is opened. A door frame 821b that receives a door 821a is installed on the opening of the box body.

The vehicle 800 further includes a light detection and ranging (LiDAR) sensor 831 installed on the front surface of the chassis 810 and a not-illustrated LiDAR sensor installed on the back surface of the chassis 810.

The LiDAR sensor 831 on the front surface that the vehicle 800 includes emits laser light in a plurality of directions that, when the front direction of the vehicle 800 is used as a reference azimuthal direction, is included in a range of azimuth angle formed with the reference azimuthal direction from −90 degrees to +90 degrees and elevation angle formed with the front direction of the vehicle 800 from −90 degrees to +90 degrees. The LiDAR sensor 831 on the front surface receives reflected light of the emitted laser light and, based on a period from the emission of the laser light to the reception of the reflected light, measures distances to a plurality of reflection points at which the laser light is reflected. Next, the LiDAR sensor 831 on the front surface calculates coordinate values of the plurality of reflection points in a three-dimensional coordinate system of the vehicle 800 with the center point of the vehicle 800 taken as the origin, based on the emission directions of the laser light and the measured distances. Subsequently, the LiDAR sensor 831 on the front surface outputs the calculated coordinate values of the plurality of reflection points to the control device 890 of the vehicle 800.

The LiDAR sensor on the back surface that the vehicle 800 includes emits infrared laser light in a plurality of directions that, when the rearward direction of the vehicle 900 is used as a reference azimuthal direction, is included in a range of azimuth angle formed with the reference azimuthal direction from −90 degrees to +90 degrees and elevation angle formed with the rearward direction of the vehicle 900 from −90 degrees to +90 degrees. In addition, the LiDAR sensor on the back surface calculates coordinate values of a plurality of reflection points of the emitted laser light in the three-dimensional coordinate system of the vehicle 800 and outputs the calculated coordinate values of the plurality of reflection points to the control device 890 of the vehicle 800.

The reason why the LiDAR sensor 831 on the front surface and the LiDAR sensor on the back surface that the vehicle 800 includes output the coordinate values of a plurality of reflection points to the control device 890 is that, in order to travel avoiding objects, such as an obstacle, the control device 890 of the vehicle 800 identifies the coordinate values in the three-dimensional space and sizes of objects existing in all directions with the vehicle 800 used as a reference.

Figure 9:
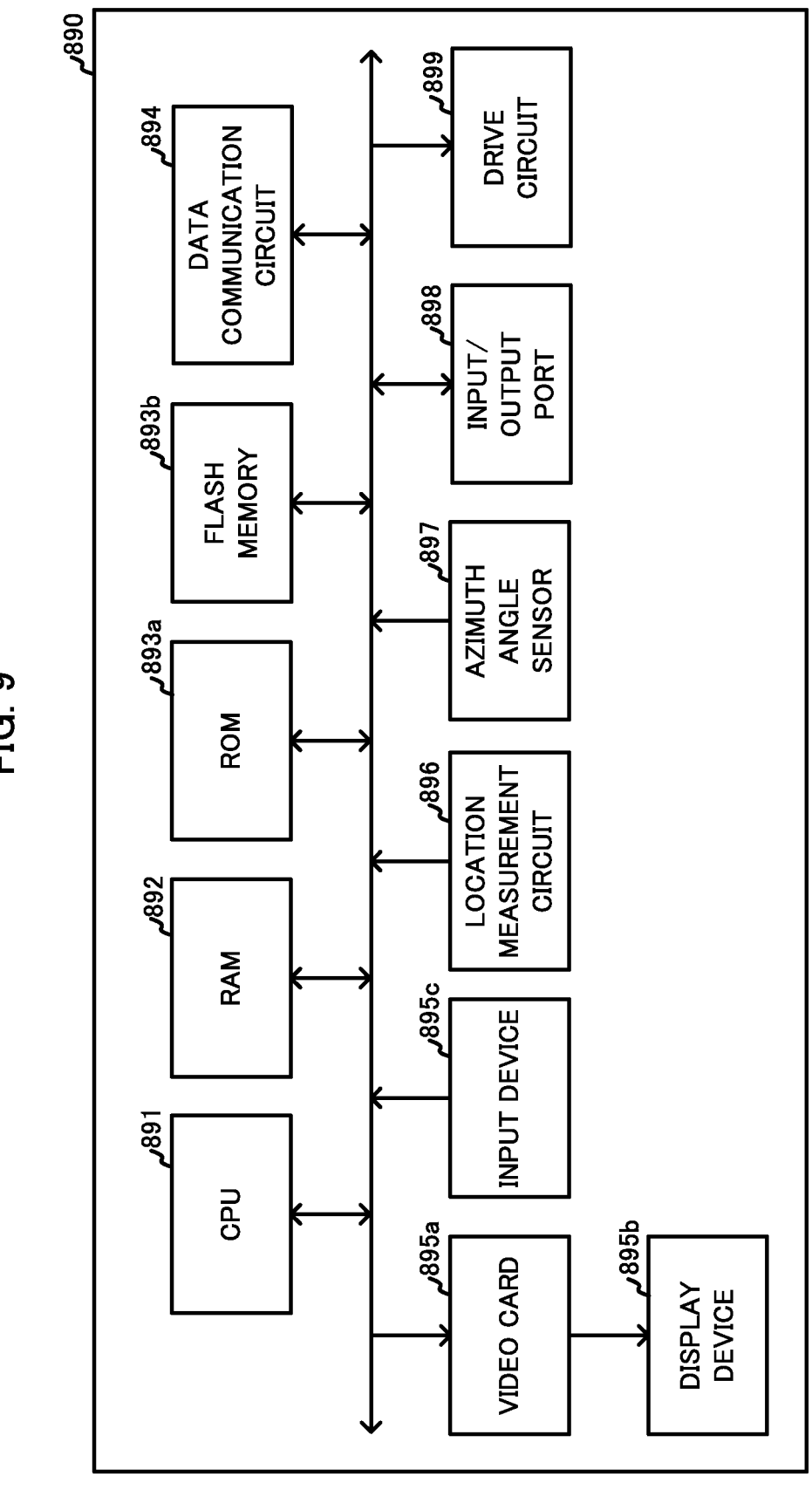
FIG. 9 is a hardware configuration diagram illustrating a configuration example of a control device that the vehicle includes.

The control device 890 of the vehicle 800 includes a CPU 891, a RAM 892, a ROM 893*a*, a flash memory 893*b*, a data communication circuit 894, a video card 895*a*, a display device 895*b*, an input device 895*c*, a location measurement circuit 896, an azimuth angle sensor 897, an input/output port 898, and a drive circuit 899, which are hardware components, as illustrated in FIG. 9. The vehicle 800 may include a plurality of CPUs and may include a plurality of RAMs and flash memories.

Configurations and functions of the CPU 891, the RAM 892, the ROM 893*a*, the data communication circuit 894, the video card 895*a*, the display device 895*b*, and the input device 895*c* that the vehicle 800 includes are the same as the configurations and functions of the CPU 101, the RAM 102, the ROM 103*a*, the data communication circuit 104, the video card 105*a*, the display device 105*b*, and the input device 105*c* that the control device 100 includes, respectively.

The flash memory 893*b* of the vehicle 800 stores various types of programs, various types of data used in execution of the programs, and tables in which data are stored. The vehicle 800 may include a hard disk in place of the flash memory 893*b*.

The location measurement circuit 896 of the vehicle 800 is a quasi-zenith satellite system (QZSS) circuit. The location measurement circuit 896 receives signals emitted from quasi-zenith satellites, measures latitude, longitude, and altitude indicating a location of the vehicle 800, based on the received signals, and outputs a signal indicating the measured latitude, longitude, and altitude. The location measurement circuit 896 may be, instead of the QZSS circuit, a global positioning system (GPS) circuit that receives GPS signals emitted by GPS satellites and measures latitude, longitude, and altitude indicating a location of the vehicle 800, based on the received GPS signals.

The azimuth angle sensor 897 of the vehicle 800 is, for example, a magnetic sensor, and measures an azimuth angle θ formed by the traveling direction, which is the front direction of the vehicle 800, and the reference azimuthal direction, which is, for example, north, in a counterclockwise direction or a clockwise direction from the reference azimuthal direction and outputs a signal indicating the measured azimuth angle θ.

The input/output port 898 of the vehicle 800 is connected to not-illustrated cables that are respectively connected to the LiDAR sensor 831 on the front surface and the LiDAR sensor on the back surface. The input/output port 898 inputs signals indicating coordinate values that the LiDAR sensor

831 on the front surface and the LiDAR sensor on the back surface respectively output, to the CPU 891.

The drive circuit 899 of the vehicle 800 is connected to not-illustrated cables that are respectively connected to not-illustrated motors that rotate the plurality of wheels. The drive circuit 899 rotates the plurality of wheels by driving the motors in accordance with a control signal output by the CPU 891. The not-illustrated motors rotating the plurality of wheels are driven consuming electric power energy supplied from a not-illustrated battery, for example, a lithium-ion battery, that the vehicle 800 includes.

When the data communication circuit 894 of the vehicle 800 receives a send request output in step S24 in FIG. 6 from the control device 100, the CPU 891 of the vehicle 800 identifies latitude, longitude, and altitude of the vehicle 800, based on a signal output from the location measurement circuit 896. Next, the CPU 891 generates vehicle location information indicating the location of the vehicle 800 in latitude, longitude, and altitude and outputs the generated vehicle location information to the data communication circuit 894 with the control device 100 as the destination. Subsequently, the data communication circuit 894 of the vehicle 800 sends the vehicle location information of the vehicle 800 to the control device 100.

Subsequently, when the data communication circuit 894 of the vehicle 800 receives movement control information output in step S15 in FIG. 3, the CPU 891 of the vehicle 800 executes movement processing as illustrated in FIG. 10 in order to move in accordance with the movement control information.

When the CPU 891 of the vehicle 800 starts the execution of the movement processing, the CPU 891 acquires the movement control information from the data communication circuit 894 and acquires information indicating a movement route from the acquired movement control information (step S51).

Next, the CPU 891 of the vehicle 800 identifies latitude, longitude, and altitude of the vehicle 800, based on a signal output from the location measurement circuit 896. Next, the CPU 891, based on the identified latitude, longitude, and altitude and latitude, longitude, and altitude of a node at the first position in a visiting sequence of a plurality of unvisited nodes included in the movement route, calculates an azimuth angle φ formed by a direction pointing from the location of the vehicle 800 to the unvisited node at the first position in the visiting sequence and the reference azimuthal direction.

Subsequently, the CPU 891 of the vehicle 800 generates a control signal to cause the azimuth angle θ indicated by a signal output from the azimuth angle sensor 897 and the calculated azimuth angle φ to coincide with each other. Subsequently, the CPU 891 outputs the generated control signal to the drive circuit 899 (step S52), and the drive circuit 899 rotates the plurality of wheels in accordance with the control signal. Through this processing, the vehicle 800 changes the traveling direction of the vehicle 800 to the direction pointing from the location of the vehicle 800 to the unvisited node at the first position in the visiting sequence.

Next, the CPU 891 of the vehicle 800 generates a control signal to move at the standard velocity in such a way as to reduce a difference between the latitude, longitude, and altitude of the vehicle 800 and the latitude, longitude, and altitude of the unvisited node at the first position in the visiting sequence and outputs the generated control signal to the drive circuit 899 (step S53). Through this processing, the vehicle 800 moves at the standard velocity toward the unvisited node at the first position in the visiting sequence.

Subsequently, the CPU 891 of the vehicle 800 determines whether or not the vehicle 800 has arrived at the start location of transportation, which is the end point of the movement route, based on whether or not the vehicle 800 has visited all of a plurality of nodes included in the movement route (step S54). On this occasion, when the CPU 891 determines that, since the vehicle 800 has not visited all of the plurality of nodes, the vehicle 800 has not arrived at the start location of transportation (step S54; No), the CPU 891 repeats the above-described process from step S52. In contrast, when the CPU 891 determines that, since the vehicle 800 has visited all of the plurality of nodes, the vehicle 800 has arrived at the start location of transportation (step S54: Yes), the CPU 891 outputs a control signal to park or come to a stop at the start location of transportation to the drive circuit 899. Subsequently, the CPU 891 outputs an arrival report announcing that the vehicle 800 has arrived at the start location of transportation to the data communication circuit 894 with the control device 100 as the destination (step S55) and thereafter terminates the execution of the movement processing.

A configuration and functions of the vehicle 900 are the same as the configuration and functions of the vehicle 800.

When the data communication circuit 104 of the control device 100 receives the arrival report, the CPU 101 of the control device 100 acquires the arrival report from the data communication circuit 104 and outputs the acquired arrival report to the data communication circuit 104 with the terminal device 300 of the store as the destination. When the terminal device 300 receives the arrival report transferred by the control device 100, the terminal device 300 displays the received arrival report.

When the employee of the store visually recognizes the displayed arrival report, the employee stores the item, the preparation of which has been completed, into the storage box 821 of the vehicle 800 or the not-illustrated storage box of the vehicle 900 that has arrived at the start location of transportation. Subsequently, when the employee performs, on the terminal device 300, an operation to cause the terminal device 300 to send a storage completion notification notifying that the storage of the item is completed, the terminal device 300 sends the storage completion notification to the control device 100 in response to the operation.

When the data communication circuit 104 of the control device 100 receives the storage completion notification, the generator 120 of the control device 100 executes the same processing as the processing in step S06 in FIG. 3, based on the transportation destination information acquired in step S21 and the start location information acquired in step S23 in FIG. 6. Through this processing, the generator 120 generates a shortest transportation route starting from the start location of transportation of the ordered item and reaching the transportation destination of the item. Next, the generator 120 generates transportation control information that includes the generated transportation route and that is information for causing the vehicle 800 or 900 having the item stored to move from the start location of transportation to the transportation destination.

Subsequently, the controller 140 of the control device 100 outputs the generated transportation control information to the data communication circuit 104 with the vehicle 800 or 900 as the destination. Through this processing, the controller 140 performs, on the vehicle 800 or 900, control to cause the vehicle 800 or 900 to transport the item from the start location of transportation to the transportation destination.

When the data communication circuit 894 of the vehicle 800 receives the transportation control information from the control device 100, the CPU 891 of the vehicle 800 executes the same processing as the movement processing illustrated in FIG. 10, based on the transportation control information. Through this processing, the vehicle 800 transports the item from the start location of transportation to the transportation destination in accordance with the transportation control information.

In the present embodiment, a transportation destination of an item is an entrance to an apartment where a recipient specified by the orderer or a substitute who receives the item in substitution for the recipient lives. Thus, when the vehicle 800 arrives at the transportation destination, the recipient or the substitute receives the item from the storage box 821 of the vehicle 800. Subsequently, the recipient or the substitute performs, on the input device 895*c* of the vehicle 800, an operation to cause the vehicle 800 to send a signal notifying that the receipt of the item is completed. When the input device 895*c* outputs the signal, the CPU 891 of the vehicle 800 causes the vehicle 800 to return to the predetermined parking spot and thereafter keep stopping or parking at the parking spot until the vehicle 800 receives new movement control information.

According to the above-described configuration, the control device 100 includes the acquirer 110 that, when an order is accepted, acquires vehicle location information indicating the location of the vehicle 800 or 900 capable of storing an item targeted by the order, start location information indicating a start location at which transportation of the item is started, and preparation information indicating preparation time required for preparation to bring the state of the item into a state where transportation is startable. In addition, the control device 100 includes the generator 120 that generates movement control information to cause the vehicle 800 or 900 to move from the location of the vehicle 800 or 900 to the start location, based on (i) the amount of energy that the vehicle 800 or 900 is estimated to consume to move from a location indicated by the acquired vehicle location information to a start location of transportation indicated by the acquired start location information and (ii) preparation time indicated by the acquired preparation information. Therefore, the control device 100 is capable of generating movement control information that, while suppressing a delay in the start of transportation, suppresses an increase in the amount of energy that the vehicle 800 or 900 consumes to move to the start location of transportation.

In addition, according to the above-described configuration, the generator 120 of the control device 100 generates N candidates of movement control information each of which includes a movement route starting from the location of the vehicle 800 or 900 and reaching the start location of transportation. In addition, the generator 120 determines, for each of the N generated candidates, an evaluation value that is based on the amount of energy that the vehicle 800 or 900 is estimated to consume when the vehicle 800 or 900 moves along the movement route of the candidate. Further, the generator 120, by selecting a candidate from among the N candidates, based on the determined evaluation values, generates movement control information. Therefore, the control device 100 is capable of generating movement control information including a movement route that surely suppresses an increase in the amount of energy that the vehicle 800 or 900 consumes to move to the start location of transportation.

Further, according to the above-described configuration, the generator 120 of the control device 100 estimates the amount of energy that the vehicle 800 or 900 consumes, based on distance of a movement route. In addition, the generator 120 estimates the amount of energy that the vehicle 800 or 900 consumes, based on change in the traveling altitude of the vehicle 800 or 900 that occurs while the vehicle 800 or 900 moves along a movement route. Because of this configuration, the control device 100 is capable of accurately estimating the amount of energy that the vehicle 800 or 900 consumes.

In addition, according to the above-described configuration, the generator 120 of the control device 100 generates movement control information with respect to each of the vehicles 800 and 900. In addition, the control device 100 includes the selector 130 to select the vehicle 800 or 900 that is caused to transport an item targeted by an order from among the vehicles 800 and 900, based on evaluation values used for the generation of movement control information. Therefore, the control device 100 is capable of selecting, from among the vehicles 800 and 900, the vehicle 800 or 900 that is capable of surely suppressing an increase in the amount of energy that the vehicle 800 or 900 consumes to move to the start location of transportation, as a vehicle caused to transport the item.

Further, according to the above-described configuration, the control device 100 further includes the controller 140 to perform, on the selected vehicle 800 or 900, control to cause the selected vehicle 800 or 900 to move from the location of the selected vehicle 800 or 900 to the start location of transportation, based on the movement control information. Therefore, the control device 100 is capable of, while suppressing a delay in the start of transportation, suppressing an increase in the amount of energy that the vehicle 800 or 900, which is caused to transport the item, consumes to move to the start location of transportation.

Modified Example 1 of Embodiment 1

In Embodiment 1, it was described that the acquirer 110 of the control device 100 acquired preparation information indicating preparation time required for preparation to bring the state of an ordered item into a state where transportation is startable and the generator 120 generated movement control information, based on the preparation time indicated by the preparation information.

However, Embodiment 1 is not limited to the above description, and, in the present modified example, the acquirer 110 of the control device 100 acquires preparation information indicating a preparation completion time at which preparation to bring the state of an item into a state where transportation is startable is to be completed and the generator 120 generates movement control information, based on the preparation completion time indicated by the preparation information.

For this purpose, the acquirer 110 of the control device 100, after having executed the processing in step S21 in FIG. 6, acquires a system time from, for example, the operating system (OS) as a time at which an order is accepted (hereinafter, referred to as an order acceptance time). Next, the acquirer 110, by executing the processing in step S22, acquires preparation time of the ordered item and total time of the preparation time and longest allowable time from the information storage 190. Subsequently, the acquirer 110 acquires preparation information indicating a preparation completion time by adding the preparation time to the order acceptance time and acquires start information indicating a start time limit of transportation by adding the total time of the preparation time and the longest allowable time to the order acceptance time.

In addition, the generator 120 of the control device 100 searches for a plurality of entire routes starting from the location of the vehicle 800 or 900 and reaching the start location of transportation, in step S06 in FIG. 3. In addition, the generator 120 selects, from among a plurality of found entire routes, N entire routes that, when the vehicle 800 or 900 moves at the standard velocity, causes an arrival time of the vehicle 800 or 900 at the start location of transportation to be later than or equal to the preparation completion time and earlier than or equal to the start time limit, as movement routes.

For this purpose, the generator 120 of the control device 100, as with Embodiment 1, searches for a plurality of entire routes starting from the location of the vehicle 800 or 900 and reaching the start location of transportation and calculates movement times with respect to a plurality of found entire routes. Next, the generator 120 calculates an arrival time for each of the plurality of entire routes by adding the movement time for the entire route to the order acceptance time. Subsequently, the generator 120 selects, from among the plurality of found entire routes, N entire routes the calculated arrival times of which are later than or equal to the preparation completion time and earlier than or equal to the start time limit of transportation, as movement routes, based on a predetermined rule including ascending order of arrival time or based on software-generated random numbers.

Modified Example 2 of Embodiment 1

Although, in Embodiment 1, it was described that the generator 120 of the control device 100, based on the amount of energy that was estimated to be consumed by the vehicle 800 or 900 when the vehicle 800 or 900 moved along a movement route included in the n-th candidate of movement control information, determined an evaluation value of the candidate, in step S44 in FIG. 7, Embodiment 1 is not limited thereto.

The generator 120 of the control device 100 according to the present modified example determines an evaluation value, based on the amount of energy that is estimated to be consumed by the vehicle 800 or 900 and start waiting time from when preparation of an ordered item is completed to when transportation of the item is started by the vehicle 800 or 900.

For this purpose, the generator 120 of the control device 100 determines an evaluation value with respect to the n-th candidate of movement control information, based on the amount of energy that is estimated to be consumed by the vehicle 800 or 900, in step S44. Subsequently, the generator 120 calculates arrival waiting time from when preparation of the item is completed to when the vehicle 800 or 900 arrives at the start location of transportation by subtracting preparation time of the ordered item from movement time for a movement route included in the n-th candidate. The generator 120 may calculate arrival waiting time by subtracting a preparation completion time from an arrival time of the vehicle 800 or 900 at the start location of transportation.

Next, the acquirer 110 of the control device 100 acquires information indicating storage time required for the employee of the store selling the ordered item to store the prepared item into the vehicle 800 or 900, from the information storage 190. The acquirer 110 also acquires information indicating operation time required for the employee to perform, on the terminal device 300, an operation to cause the terminal device 300 to send a storage completion notification, from the information storage 190. The acquirer 110 further acquires information indicating transportation control start time required from when the control device 100 receives the storage completion notification to when, by sending the transportation control information to the vehicle 800 or 900, the control device 100 causes the vehicle 800 or 900 to start transportation.

In the present modified example, the information indicating the storage time, the information indicating the operation time, and the information indicating the transportation control start time are respectively stored by the information storage 190 in advance. A person skilled in the art can determine, by experiment, suitable values of the storage time, the operation time, and the transportation control start time. Further, one or more of the storage time, the operation time, and the transportation control start time may be 0 minutes.

Subsequently, the generator 120 of the control device 100, by adding the storage time, the operation time, and the transportation control start time, which are indicated by the acquired information, to the calculated arrival waiting time, calculates start waiting time from when preparation is completed to when transportation of the item is started.

Next, the generator 120 of the control device 100 calculates a correction value for the evaluation value of the n-th candidate, based on the calculated start waiting time. The correction value calculated in the present modified example is used for correction of an evaluation value by means of subtraction. Although, thus, the generator 120, by, for example, adding a predetermined constant to the start waiting time, calculates a correction value in such a manner that the longer the start waiting time is, the higher the correction value becomes, the method for calculating a correction value is not limited thereto.

Next, the acquirer 110 of the control device 100 acquires a positive weighting factor for a correction value, which the information storage 190 stores in advance. Subsequently, the generator 120 determines an evaluation value after correction by weighting the calculated correction value by the acquired weighting factor and subtracting the weighted correction value from the evaluation value determined in step S44. Subsequently, the generator 120 terminates the execution of the evaluation value calculation processing.

Since, in the present modified example, the longer the start waiting time from when preparation of an item is completed to when transportation of the item is started is, the higher the correction value is calculated, the longer the start waiting time is, the lower the evaluation value after correction is determined to be than the value before correction. The reason why an evaluation value is corrected in such a manner is that movement control information that extends the start waiting time longer is less appropriate because such movement control information delays start of transportation further.

According to the above-described configuration, the generator 120 of the control device 100 determines, for each of the N candidates, an evaluation value that is further based on the start waiting time from when the preparation of the ordered item is completed to when the transportation of the item is started. Therefore, the control device 100 is capable of generating movement control information that surely suppresses a delay in the start of transportation of an item.

In addition, when an ordered item has a property that the state of the item changes as time passes, the control device 100 is capable of suppressing a change in the state of the item before the start of transportation, the change in the state being a change to a state different from a state at the time of preparation completion. That is, the control device 100 is capable of suppressing a change in the state of an item having, for example, a property that noodles get soft as time passes before the start of transportation, the change in the state of the item being a change from a state where noodles have not got soft to a state where the noodles have got soft. In addition, the control device 100 is capable of suppressing a change in the temperature of an item having, for example, a necessity of heating cooking and a property of cooling with the lapse of time before the start of transportation, the change in the temperature of the item being a change from a temperature higher than a predetermined temperature to a temperature lower than or equal to the predetermined temperature.

Further, since the control device 100 suppresses a delay in the start of transportation of an item, the control device 100 is capable of improving efficiency of transportation of the item by the vehicle 800 or 900. Although, in the present modified example, transportation efficiency of the vehicle 800 or 900 is represented by the number of items per unit time that the vehicle 800 or 900 transports, the definition of the transportation efficiency is not limited thereto.

Although, in the present modified example, it was described that the longer the start waiting time was, the higher the generator 120 of the control device 100 calculated a correction value, the present modified example is not limited thereto. The generator 120 of the control device 100 may, by, for example, using an inverse of start waiting time as a correction value, calculate a correction value in such a manner that the longer the start waiting time is, the lower the correction value becomes. In addition, the generator 120 may weight the calculated correction value by a positive weighting factor and thereafter add the weighted correction value to the evaluation value determined in step S44.

Modified Example 3 of Embodiment 1

Although, in Embodiment 1, it was described that the generator 120 of the control device 100 determined an evaluation value, based on the amount of energy that was estimated to be consumed by the vehicle 800 or 900, in step S44 in FIG. 7, Embodiment 1 is not limited thereto.

The generator 120 of the control device 100 according to the present modified example determines an evaluation value, based on the amount of energy that is estimated to be consumed by the vehicle 800 or 900 and allowed time from when the vehicle 800 or 900 arrives at the start location of transportation to when the start time limit of transportation expires.

For this purpose, the acquirer 110 of the control device 100, by executing the same processing as the processing in Modified Example 1 of Embodiment 1, acquires start information indicating a start time limit of transportation. In addition, the generator 120, as with Modified Example 1 of Embodiment 1, calculates, with respect to N candidates of movement control information of the vehicle 800 or 900, arrival times of the vehicle 800 or 900 at the start location of transportation, in step S06 in FIG. 3.

Subsequently, the generator 120 of the control device 100, after determining an evaluation value with respect to the n-th candidate of the movement control information, based on the amount of energy that is estimated to be consumed by the vehicle 800 or 900, in step S44 in FIG. 7, calculates allowed time from an arrival time calculated with respect to the candidate to the start time limit indicated by the start information. The generator 120 may calculate the allowed time by subtracting movement time from the total time of preparation time and longest allowable time.

Next, the generator 120 of the control device 100 calculates a correction value for the evaluation value of the n-th candidate, based on the calculated allowed time. The correction value calculated in the present modified example is used for correction of an evaluation value by means of addition. Although, thus, the generator 120, by, for example, adding a predetermined constant to the allowed time, calculates a correction value in such a manner that the longer the allowed time is, the higher the correction value becomes, the method for calculating a correction value is not limited thereto.

Next, the acquirer 110 of the control device 100 acquires a positive weighting factor for a correction value, which the information storage 190 stores in advance. Subsequently, the generator 120 weights the calculated correction value by the acquired weighting factor and adds the weighted correction value to the evaluation value calculated in step S44. Since, in the present modified example, the longer the allowed time is, the higher the correction value is calculated, the longer the allowed time is, the higher the evaluation value after correction is determined to be than the value before correction. The reason why the evaluation value is corrected in such a manner is that movement control information that extends the allowed time longer is more appropriate because such movement control information expedites start of transportation further.

According to the above-described configuration, the acquirer 110 of the control device 100 further acquires start information indicating a start time limit for transportation of an item targeted by an order, and the generator 120 determines, for each of the N candidates of movement control information, an evaluation value that is further based on the start information. Therefore, the control device 100 is capable of generating movement control information that surely suppresses a delay in the start of transportation of an item.

Although, in the present modified example, it was described that the longer the allowed time was, the higher the generator 120 of the control device 100 calculated a correction value, the present modified example is not limited thereto. The generator 120 may, by, for example, using an inverse of a value obtained by adding a predetermined positive constant to the allowed time, calculate a correction value in such a manner that the longer the allowed time is, the lower the correction value becomes. The reason why a positive constant is added to the allowed time is to enable a correction value to be calculated even when the allowed time is 0 minutes. In addition, the generator 120 may weight the correction value calculated based on the allowed time by a positive weighting factor and thereafter subtract the weighted correction value from the evaluation value calculated in step S44.

Modified Example 4 of Embodiment 1

In Modified Example 2 of Embodiment 1, it was described that the generator 120 of the control device 100 determined an evaluation value, based on the amount of energy that was estimated to be consumed by the vehicle 800 or 900 and start waiting time. In addition, in Modified Example 3 of Embodiment 1, it was described that the generator 120 determined an evaluation value, based on the amount of energy that was estimated to be consumed and allowed time before a start time limit.

However, Embodiment 1 is not limited to the above description, the generator 120 of the control device 100 according to the present modified example determines an evaluation value, based on the amount of energy that is estimated to be consumed, the start waiting time or the allowed time, and the longest allowable time of an item to be transported.

For this purpose, the acquirer 110 of the control device 100 acquires information indicating longest allowable time associated with the item ID of an ordered item in the item table in FIG. 5, and the generator 120 calculates a positive weighting factor, based on longest allowable time indicated by the acquired information.

Although, in the present modified example, the generator 120 of the control device 100, by multiplying an inverse of the longest allowable time by a predetermined positive constant, calculates a weighting factor for a correction value in such a manner that the shorter the longest allowable time is, the higher the weighting factor becomes, the method for calculating a weighting factor is not limited thereto. The reason why a weighting factor is calculated in such a manner is that the longest allowable time of an item is determined in advance according to a property of the item and properties of items include a property that the state of an item changes as time passes. That is, the reason is that an item having a shorter longest allowable time, the longest allowable time being longest time that is allowed as a period of time from when preparation is completed to when transportation is started, has a property that the state of the item changes in a shorter elapsed time.

Subsequently, the generator 120 of the control device 100 weights a correction value calculated based on the start waiting time or the allowed time by the calculated weighting factor and adds the weighted correction value to the evaluation value calculated in step S44. Since, in the present modified example, the shorter the longest allowable time is, the larger a weighting factor is calculated, the weight for a correction value calculated based on the start waiting time or the allowed time becomes larger compared with the weight for an evaluation value determined based on the amount of energy that is estimated to be consumed by the vehicle 800 or 900. Therefore, the control device 100 is capable of, while suppressing an increase in the amount of energy that the vehicle 800 or 900 consumes to move to the start location of transportation, surely suppressing change in the state of the item that occurs before the arrival of the vehicle 800 or 900 at the start location of transportation.

Modified Example 5 of Embodiment 1

In Embodiment 1, it was described that, in step S06 in FIG. 3, N movement routes were selected, and the selected N movement routes were routes starting from the location of the vehicle 800 or 900 and reaching the start location of transportation and, when the vehicle 800 moved at the standard velocity, requiring movement times greater than or equal to preparation time and less than or equal to total time.

However, Embodiment 1 is not limited to the above description. In the present modified example, N combinations of a movement route starting from the location of the vehicle 800 or 900 and reaching the start location of transportation and movement velocity that is a velocity less than or equal to a predetermined velocity limit and that is a velocity for the vehicle 800 or 900 to move along the movement route within movement time greater than or equal to preparation time and less than or equal to the total time of the preparation time and longest allowable time are generated.

For this purpose, the generator 120 of the control device 100 searches for a plurality of entire routes starting from the location of the vehicle 800 or 900 and reaching the start location of transportation and calculates total distances with respect to the plurality of found entire routes, in step S06. Subsequently, the generator 120, with respect to each of the plurality of entire routes, calculates a movement velocity that causes movement time to be greater than or equal to the preparation time and less than or equal to the total time, based on the calculated total distance. Through this processing, the generator 120 generates a plurality of combinations of an entire route and a movement velocity.

Although, in the present modified example, the generator 120 of the control device 100 calculates a lowest velocity within a range of movement velocity that causes movement time to be greater than or equal to the preparation time and less than or equal to the total time, the present modified example is not limited thereto. The velocity that the generator 120 calculates may be any velocity, provided that the velocity is a movement velocity that causes movement time to be greater than or equal to the preparation time and less than or equal to the total time. For example, the generator 120 may calculate a velocity based on a predetermined rule or software-generated random numbers within a range of movement velocity that causes movement time to be greater than or equal to the preparation time and less than or equal to the total time.

Subsequently, the acquirer 110 of the control device 100 acquires information indicating a velocity limit, which the information storage 190 stores in advance. Next, the generator 120 excludes a combination including a movement velocity that is higher than a velocity limit indicated by the acquired information from the plurality of generated combinations. Next, the generator 120 selects, from among the combinations after exclusion, N combinations as combinations of a movement route and a movement velocity of the vehicle 800 or 900. Although, in the present modified example, N combinations are selected in ascending order of movement velocity, the present modified example is not limited thereto, and N combinations may, for example, be selected from among a plurality of combinations including a movement velocity lower than a predetermined velocity, based on a predetermined rule or software-generated random numbers.

Subsequently, the generator 120 of the control device 100 assigns numbers of 1 to N, which indicate the first to the N-th, respectively, to the N combinations, in step S07. Next, the generator 120 generates a first candidate of the movement control information of the vehicle 800 or 900 including information indicating a movement route and information indicating a movement velocity both of which are included in the first combination. Likewise, the generator 120 generates second to N-th candidates of the movement control information of the vehicle 800 or 900.

Subsequently, the control device 100, by executing the processing in step S31 in FIG. 7, acquires a conversion coefficient alpha_1 to convert distance that the vehicle 800 moves to the amount of energy that the vehicle 800 or 900 is estimated to consume in order to move the distance, and thereafter corrects the acquired conversion coefficient alpha_1, based on the movement velocities. In the present modified example, the generator 120 of the control device 100, for example, multiplies the conversion coefficient alpha_1 before correction by a value obtained by dividing a movement velocity by the standard velocity. Although, through this processing, the generator 120 corrects the conversion coefficient alpha_1 in such a manner that, the higher the movement velocity is than the standard velocity, the larger value the conversion coefficient alpha_1 is corrected to than the value before correction, and, the lower the movement velocity is than the standard velocity, the smaller value the conversion coefficient alpha_1 is corrected to than the value before correction, the method for correcting the conversion coefficient alpha_1 is not limited thereto.

Subsequently, the generator 120 of the control device 100, by executing the processing in steps S32 to S44, determines an evaluation value of the n-th candidate by use of a conversion coefficient alpha_1 after correction. Next, the generator 120, by selecting a candidate, based on the evaluation values determined by use of the conversion coefficients alpha_1 after correction in step S12 in FIG. 3, generates movement control information of the vehicles 800 and 900. In addition, the selector 130 selects the vehicle 800 or 900 to be caused to transport the item, based on the evaluation values determined by use of the conversion coefficients alpha_1 after correction, in step S14. Subsequently, in step S15, the controller 140 outputs the movement control information including information indicating a movement route and information indicating a movement velocity to the data communication circuit 104 with the selected vehicle 800 or 900 as the destination. Through this processing, the controller 140 performs, on the vehicle 800 or 900, control to cause the vehicle 800 or 900 to move along the movement route at the movement velocity.

The CPU 891 of the vehicle 800 acquires information indicating a movement route and information indicating a movement velocity from the movement control information received from the control device 100, in step S51 in FIG. 10. Next, the CPU 891 outputs a control signal to move in the forward direction along a movement route indicated by the acquired information at a movement velocity indicated by the acquired information to the drive circuit 899, which is connected to the not-illustrated motors rotating the plurality of wheels, in step S53.

Modified Example 6 of Embodiment 1

Although, in Embodiment 1, it was described that the vehicles 800 and 900 moved along a movement route in the standard mode, Embodiment 1 is not limited thereto. In the present modified example, the vehicles 800 and 900 moves along a movement route in any one of a low-velocity mode, the standard mode, and a high-velocity mode.

The low-velocity mode is an operation mode in which a predetermined velocity lower than the standard velocity (hereinafter, referred to as low velocity) is set to the vehicle 800 or 900, and the high-velocity mode is an operation mode in which a predetermined velocity higher than the standard velocity (hereinafter, referred to as high velocity) is set to the vehicle 800 or 900.

For this purpose, the generator 120 of the control device 100 according to the present modified example searches for N' (where N' is a natural number) entire routes starting from the location of the vehicle 800 or 900 and reaching the start location of transportation and calculates total distances with respect to N' found entire routes, in step S06 in FIG. 3. Subsequently, the generator 120 of the control device 100, with respect to each of the N' found entire routes, identifies, among operation modes in each of which a velocity that causes movement time to be greater than or equal to the preparation time and less than or equal to the total time is set, a slowest mode in which the lowest velocity is set.

For this purpose, the acquirer 110 of the control device 100 acquires information indicating the low velocity, information indicating the standard velocity, and information indicating the high velocity, which the information storage 190 stores in advance. Next, the generator 120 assigns numbers of 1 to N', which indicate the first to the N'-th, respectively, to the N' entire routes and thereafter initializes a variable n' identifying the number of an entire route with a value of 1.

Subsequently, the generator 120 of the control device 100 determines whether or not the value of the variable n' is less than or equal to N', which is the number of entire routes. On this occasion, when the generator 120 determines that the value of the variable n' is less than or equal to N', the generator 120 determines whether or not, when the vehicle 800 or 900 moves along an entire route having a number identified by the variable n' at the low velocity, which is set in the low-velocity mode, movement time is greater than or equal to the preparation time and less than or equal to the total time, based on the total distance of the entire route and the low velocity.

On this occasion, when the generator 120 of the control device 100 determines that the movement time is less than the preparation time, the generator 120 determines that no operation mode exists in which a velocity is set that causes the movement time to be greater than or equal to the preparation time and less than or equal to the total time. Subsequently, the generator 120 increments the value of the variable n' by one and thereafter repeats the above-described process from the processing of determining whether or not the value of the variable n' is less than or equal to N'.

In contrast, when the generator 120 of the control device 100 determines that the movement time is greater than or equal to the preparation time and less than or equal to the total time, the generator 120 determines that the low-velocity mode is the slowest mode. Next, the generator 120 selects the entire route having a number identified by the value of the variable n' as a movement route and generates a combination of the selected movement route and the low-velocity mode. Subsequently, the generator 120 increments the value of the variable n' by one and thereafter repeats the above-described process from the processing of determining whether or not the value of the variable n' is less than or equal to N'.

In addition, in contrast, when the generator 120 of the control device 100 determines that the movement time is longer than the total time, the generator 120 determines whether or not, when the vehicle 800 or 900 moves along an entire route having a number identified by the variable n' at the standard velocity, the movement time is greater than or equal to the preparation time and less than or equal to the total time.

On this occasion, when the generator 120 of the control device 100 determines that the movement time is greater than or equal to the preparation time and less than or equal to the total time, the generator 120 determines that the standard mode is the slowest mode. Next, the generator 120 selects the entire route as a movement route and generates a combination of the selected movement route and the standard mode. Subsequently, the generator 120 increments the value of the variable n' by one and thereafter repeats the above-described process from the processing of determining whether or not the value of the variable n' is less than or equal to N'.

In addition, in contrast, when the generator 120 of the control device 100 determines that the movement time is longer than the total time, the generator 120 determines whether or not, when the vehicle 800 or 900 moves along the entire route at the high velocity, the movement time is greater than or equal to the preparation time and less than or equal to the total time.

On this occasion, when the generator 120 of the control device 100 determines that the movement time is greater than or equal to the preparation time and less than or equal to the total time, the generator 120 determines that the high-velocity mode is the slowest mode. Next, the generator 120 selects the entire route as a movement route and generates a combination of the selected movement route and the high-velocity mode. Subsequently, the generator 120 increments the value of the variable n' by one and thereafter repeats the above-described process from the processing of determining whether or not the value of the variable n' is less than or equal to N'.

In contrast, when the generator 120 of the control device 100 determines that the movement time is longer than the total time, the generator 120 determines that no operation mode exists in which a velocity is set that causes the movement time to be greater than or equal to the preparation time and less than or equal to the total time. Subsequently, the generator 120 increments the value of the variable n' by one and thereafter repeats the above-described process from the processing of determining whether or not the value of the variable n' is less than or equal to N'.

When the generator 120 of the control device 100 determines that the value of the variable n' is greater than N', the generator 120 counts the number of generated combinations, which is denoted by N, and assigns numbers of 1 to N, which indicate the first to the N-th, respectively, to the N generated combinations. Next, the generator 120 generates a first candidate of movement control information of the vehicle 800 or 900 including information indicating a movement route and mode information indicating the slowest mode both of which are included in the first combination, in step S07. Likewise, the generator 120 generates second to N-th candidates of the movement control information of the vehicle 800 or 900.

Subsequently, the acquirer 110 of the control device 100 acquires a conversion coefficient alpha_l that the information storage 190 stores in advance in association with mode information included in the n-th candidate, in step S31 in FIG. 7. In the present modified example, a conversion coefficient alpha_l that the information storage 190 stores in association with mode information indicating the high-velocity mode has a larger value than a conversion coefficient alpha_l that the information storage 190 stores in association with mode information indicating the standard mode. The reason why the information storage 190 stores such conversion coefficients alpha_l is that, since the high velocity set in the high-velocity mode is higher than the standard velocity set in the standard mode, the amount of energy that the vehicle 800 or 900 is estimated to consume to move a unit distance in the high-velocity mode is larger than the amount of energy that the vehicle 800 or 900 is estimated to consume to move a unit distance in the standard mode.

In addition, a conversion coefficient alpha_l that the information storage 190 stores in association with mode information indicating the low-velocity mode has a smaller value than a conversion coefficient alpha_l that the information storage 190 stores in association with mode information indicating the standard mode. The reason why the information storage 190 stores such conversion coefficients alpha_l is that the amount of energy that the vehicle 800 or 900 is estimated to consume to move a unit distance in the low-velocity mode is smaller than the amount of energy that the vehicle 800 or 900 is estimated to consume to move a unit distance in the standard mode.

Subsequently, the control device 100, by executing the processing in steps S32 to S44, determines an evaluation value of the n-th candidate by use of a conversion coefficient alpha_l corresponding to the slowest mode. Next, the generator 120, by selecting a candidate, based on the evaluation values determined by use of conversion coefficients alpha_l corresponding to the slowest modes, generates movement control information of the vehicles 800 and 900, in step S12 in FIG. 3. In addition, the selector 130 selects the vehicle 800 or 900 to be caused to transport the item, based on the evaluation values determined by use of conversion coefficients alpha_l corresponding to the slowest modes, in step S14. Subsequently, in step S15, the controller 140 outputs the movement control information including information indicating a movement route and mode information indicating the slowest mode to the data communication circuit 104 with the vehicle 800 or 900 as the destination. Through this processing, the controller 140 performs, on the vehicle 800 or 900, control to cause the vehicle 800 or 900 to move along the movement route in the slowest mode.

The CPU 891 of the vehicle 800 according to the present modified example acquires information indicating a movement route and mode information indicating the slowest mode from the movement control information received from the control device 100, in step S51 in FIG. 10. Next, the CPU 891 acquires information that is information that the flash memory 893b stores in advance in association with the acquired mode information and that indicates a velocity set in the slowest mode indicated by the mode information. Subsequently, the CPU 891 outputs a control signal to move in the forward direction along a movement route indicated by the acquired information at a velocity indicated by the acquired information to the drive circuit 899, in step S53.

According to the above-described configuration, each of N candidates of the movement control information of the vehicle 800 or 900 further includes information indicating an operation mode of the vehicle 800 or 900 at the time of movement along a movement route. In addition, the generator 120 of the control device 100 determines, for each of the N candidates, an evaluation value that is based on the amount of energy that is estimated to be consumed by the vehicle 800 or 900 when the vehicle 800 or 900 moves along the movement route in the operation mode. Therefore, the control device 100 is capable of surely suppressing an increase in the amount of energy that the vehicle 800 or 900 consumes to move to the start location of transportation.

Modified Example 7 of Embodiment 1

In Modified Example 6 of Embodiment 1, it was described that, in step S06 in FIG. 3, the generator 120 of the control device 100, with respect to each of N movement routes starting from the location of the vehicle 800 or 900 and reaching the start location of transportation, identified, among operation modes in each of which a velocity was set that caused movement time to be greater than or equal to preparation time and less than or equal to total time, a slowest mode in which the lowest velocity was set.

However, Embodiment 1 is not limited to the above description, and the generator 120 of the control device 100 according to the present modified example, with respect to each of N movement routes starting from the location of the vehicle 800 or 900 and reaching the start location of transportation, identifies one or a plurality of operation modes in each of which a velocity is set that causes movement time to be greater than or equal to preparation time and less than or equal to total time.

For this purpose, the generator 120 of the control device 100 according to the present modified example searches for N' (where N' is a natural number) entire routes and initializes a variable n' with a value of 1, in step S06. Next, the generator 120 determines whether or not the value of the variable n' is less than or equal to N', which is the number of entire routes. On this occasion, when the generator 120 determines that the value of the variable n' is less than or equal to N', the generator 120 determines whether or not an operation mode (hereinafter, referred to as a candidate mode) exists in which a velocity is set that causes movement time of an entire route having a number identified by the value of the variable n' to be greater than or equal to the preparation time and less than or equal to the total time.

On this occasion, when the generator 120 of the control device 100 determines that no candidate mode exists, the generator 120 increments the value of the variable n' by one and thereafter repeats the above-described process from the processing of determining whether or not the value of the variable n' is less than or equal to N'.

In contrast, when the generator 120 of the control device 100 determines that a candidate mode exists, the generator 120 counts the number of candidate modes, which is denoted by I. Next, the generator 120 selects an entire route having a number identified by the values of the variable n' as a movement route and generates I combinations of the selected movement route and I candidate modes. Subsequently, the generator 120 increments the value of the variable n' by one and thereafter repeats the above-described process from the processing of determining whether or not the value of the variable n' is less than or equal to N'.

When the generator 120 of the control device 100 determines that the value of the variable n' is greater than N', the generator 120, as with Modified Example 6 of Embodiment 1, executes the processing in steps S07 to S15. Through this processing, the generator 120 counts the number of generated combinations, which is denoted by N, and assigns numbers of 1 to N, which indicate the first to the N-th, respectively, to the N generated combinations. Next, the generator 120 generates a first candidate of movement control information of the vehicle 800 or 900 including information indicating a movement route and mode information indicating an operation mode both of which are included in the first combination. Likewise, the generator 120 generates second to N-th candidates of the movement control information of the vehicle 800 or 900.

Subsequently, the control device 100 generates movement control information including information indicating a movement route and mode information indicating an operation mode, based on the N candidates and sends the generated movement control information to the vehicle 800 or 900.

When the movement control information is received, the CPU 891 of the vehicle 800 according to the present modified example, as with Modified Example 6 of Embodiment 1, executes the movement processing illustrated in FIG. 10. Through this processing, the vehicle 800 acquires information indicating an operation mode and information indicating a movement route from the movement control information and moves in the forward direction along the movement route at a set velocity of the operation mode indicated by the acquired information.

Modified Example 8 of Embodiment 1

In Embodiment 1, it was described that, when the vehicles 800 and 900 transported an item to a transportation destination specified by an orderer, the vehicles 800 and 900 moved to a predetermined parking spot and kept stopping or parking at the parking spot until the vehicles 800 and 900 received movement control information from the control device 100.

However, Embodiment 1 is not limited to the above description, and, when the vehicle 800 or 900, after having transported an item, receives movement control information from the control device 100 during movement before arriving at the parking spot, the vehicle 800 or 900 may start movement to a start location of transportation in accordance with the received movement control information. In addition, Embodiment 1 is not limited to the configuration in which the vehicles 800 and 900 move to the parking spot after transportation of an item, and the vehicles 800 and 900 may move to any place after transportation of an item, provided that the place is a location at which the vehicles 800 and 900 can park or can come to a stop.

Further, when the vehicles 800 and 900 have transported an item to a transportation destination, the vehicles 800 and 900 may circle or travel back and forth at a predetermined velocity in a vicinity of the transportation destination or a vicinity of a predetermined spot until the vehicles 800 and 900 receive new movement control information from the control device 100. In the present modified example, the vicinity of a transportation destination means a region on the transportation destination side of a boundary line that is located a predetermined distance away from the transportation destination. In addition, the vicinity of a predetermined spot means a region on the spot side of a boundary line that is located a predetermined distance away from the spot.

Further, the vehicles 800 and 900 may once stop at a location within the vicinity of the transportation destination or the vicinity of the predetermined spot and thereafter circle or travel back and forth in the vicinity of the transportation destination or the vicinity of the predetermined spot, may circle or travel back and forth and thereafter stop, or may repeat stopping and circling or traveling back and forth.

Modified Example 9 of Embodiment 1

Figure 11:
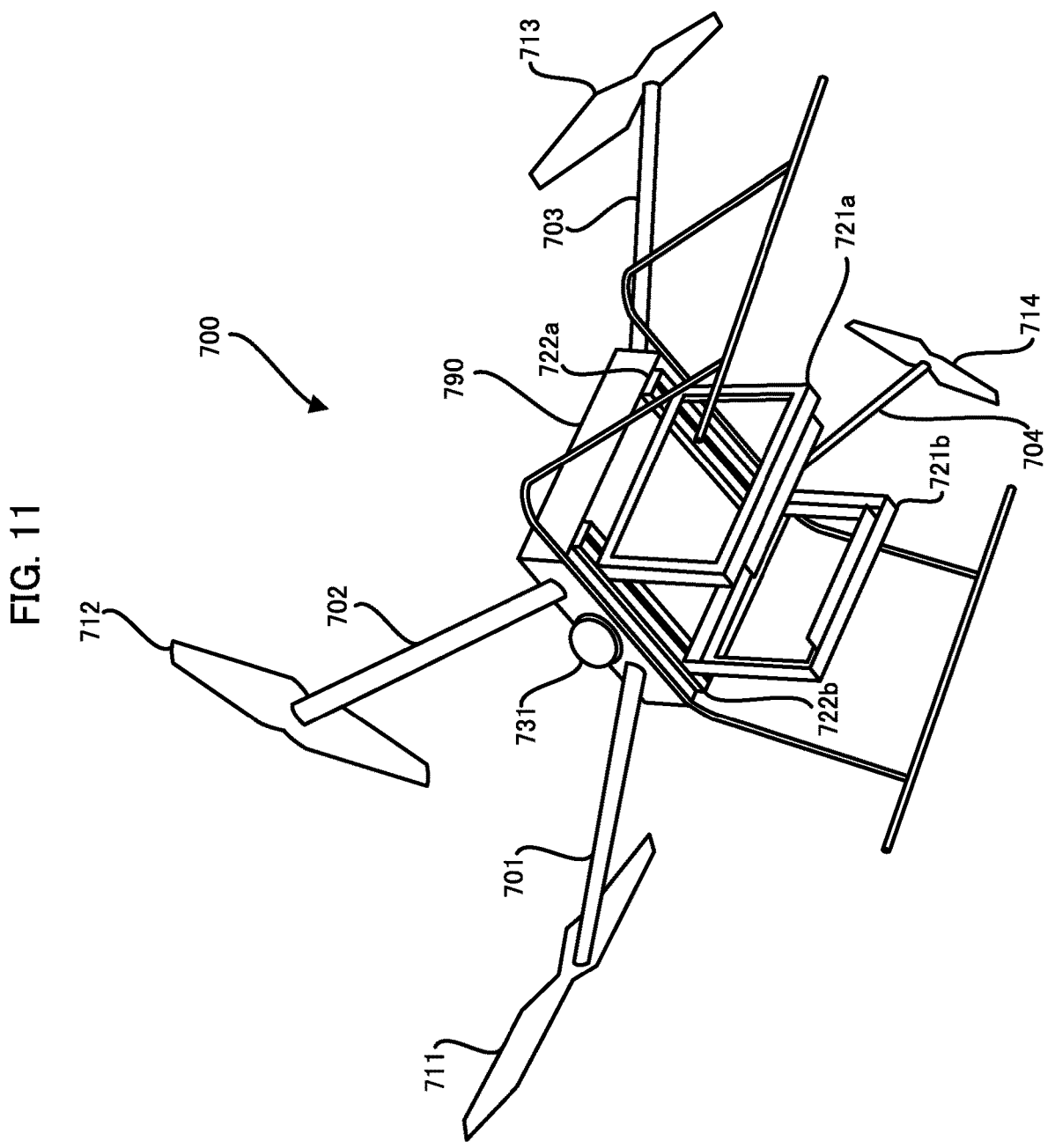
FIG. 11 is an appearance configuration diagram illustrating an appearance example of a vehicle according to Modified Example 9 of Embodiment 1.

In Embodiment 1, it was described that the transportation system 1 included the delivery vehicles 800 and 900 that are unmanned ground vehicles. However, Embodiment 1 is not limited to the configuration, and the transportation system 1 according to the present modified example includes a vehicle 700, as illustrated in FIG. 11, that is an unmanned aircraft, such as a drone, and the vehicle 900, which is an unmanned ground vehicle.

The vehicle 700 includes a control device 790 to control an attitude and flight of the vehicle 700 and propeller arms 701 and 702 and propeller arms 703 and 704 protruding right forward and left forward from the front surface of the control device 790 and left rearward and right rearward from the back surface of the control device 790, respectively. In addition, the vehicle 700 includes propellers 711 to 714 installed on the tips of the propeller arms 701 to 704, respectively and not-illustrated motors to rotate the propellers 711 to 714 in accordance with control by the control device 790. The motors to rotate the propellers 711 to 714 are driven consuming electric power energy accumulated in a not-illustrated battery that the vehicle 700 includes.

Further, the vehicle 700 includes a first holding frame 721a and a second holding frame 721b to surround and hold an item, on the under surface of the control device 790. The first holding frame 721a surrounds and holds the four sides of one (hereinafter, referred to as a first surrounded face) of the side faces of a rectangular parallelepiped shaped cardboard, in which an item is packaged, and the second holding frame 721b surrounds and holds the four sides of another side face (hereinafter, referred to as a second surrounded face) opposite to the first surrounded face surrounded and held by the first holding frame 721a.

In addition, the vehicle 700 includes, on the under surface of the control device 790, guide rails 722a and 722b that extend in the normal direction of the first surrounded face and the second surrounded face of the item, suspend the first holding frame 721a and the second holding frame 721b, and have the movement direction of the first holding frame 721a and the second holding frame 721b as the extending direction.

Further, the vehicle 700 includes a not-illustrated motor that causes the first holding frame 721a and the second holding frame 721b to surround and hold an item by moving, in accordance with control by the control device 790, the first holding frame 721a and the second holding frame 721b in directions in which the first holding frame 721a and the second holding frame 721b come close to each other. The not-illustrated motor causes the first holding frame 721a and the second holding frame 721b to release the held item by moving, in accordance with control by the control device 790, the first holding frame 721a and the second holding frame 721b in directions in which the first holding frame 721a and the second holding frame 721b move away from each other.

The vehicle 700 also includes a LiDAR sensor 731 installed on the front surface of the control device 790 and a not-illustrated LiDAR sensor installed on the back surface of the control device 790. Configurations and functions of the LiDAR sensor 731 on the front surface and the LiDAR sensor on the back surface that the vehicle 700 includes are the same as the configurations and functions of the LiDAR sensor 831 on the front surface and the LiDAR sensor on the back surface that the vehicle 800 includes.

The control device 790 of the vehicle 700 includes a not-illustrated CPU, RAM, ROM, flash memory, data communication circuit, video card, display device, input device, location measurement circuit, azimuth angle sensor, input/output port, and drive circuit, which are hardware components. Configurations and functions of the hardware components that the control device 790 of the vehicle 700 includes are the same as the configurations and functions of the hardware components that the control device 890, illustrated in FIG. 9, of the vehicle 800 includes.

The drive circuit of the vehicle 700 is connected to not-illustrated cables that are respectively connected to the not-illustrated motors that rotate the propellers 711 to 714. The drive circuit drives, in accordance with signals output by the CPU, the not-illustrated motors that rotate the propellers 711 to 714. The driver circuit of the vehicle 700 drives, in accordance with a signal output by the CPU, the motor that causes the first holding frame 721a and the second holding frame 721b to move.

When the not-illustrated data communication circuit that the vehicle 700 includes receives movement control information, the CPU of the vehicle 700 execute the movement processing illustrated in FIG. 10. Through this processing, the vehicle 700 flies a movement route included in the movement control information at the standard velocity and thereby moves to the start location of transportation.

The generator 120 of the control device 100 according to the present modified example, based on whether or not the altitude of the start node is lower than the altitude of the end node, determines whether or not an air route indicated by the edge has a rising gradient, in step S40 in FIG. 7 (step S40). On this occasion, when the generator 120 determines that the air route has a rising gradient because the altitude of the start node is lower than the altitude of the end node (step S40; Yes), the generator 120, as with Embodiment 1, calculates an altitude difference H between the altitude of the start node and the altitude of the end node (step S41). Next, the generator 120, by multiplying the calculated altitude difference H by a conversion coefficient alpha_h, estimates the amount of energy consumed by the vehicle 700 in order to ascend the altitude difference H to be alpha_h*H. Next, the generator 120 adds the estimated amount of energy alpha_h*H to the variable CE (step S42).

In the present modified example, it was described that the vehicle 700 included, on the under surface of the control device 790, the first holding frame 721a and the second holding frame 721b to surround and hold an item and the guide rails 722a and 722b to define the movement direction of the first holding frame 721a and the second holding frame 721b. However, Embodiment 1 is not limited to the configuration, and the vehicle 700 may include, on the under surface of the control device 790, a not-illustrated storage cabinet to store an item. A configuration and functions of the storage cabinet that the vehicle 700 includes are the same as the configuration and functions of the storage cabinet 820 that the vehicle 800 includes.

Although, in the present modified example, it was described that the vehicle 900 was a ground traveling vehicle, Embodiment 1 is not limited thereto. The vehicle 900 may be an unmanned aircraft that has the same configuration and functions as the configuration and functions of the vehicle 700.

Although, in the present modified example, it was described that the vehicle 700 was an unmanned aircraft, Embodiment 1 is not limited thereto, and the vehicle 700 may be an unmanned flying object. Further, although, in the present modified example, it was described that the vehicle 700 was a drone that gains lift and thrust from the propeller 711 to 714, Embodiment 1 is not limited thereto. The vehicle 700 may include wings and gain lift from the wings or may include a gasbag filled with gas the specific gravity of which is lower than air and gain lift from the gasbag. In addition, the vehicle 700 may include a jet engine or a rocket engine and gain thrust from the jet engine or the rocket engine.

Modified Example 10 of Embodiment 1

Although, in Embodiment 1, it was described that the batteries that the vehicles 800 and 900 include were lithium-ion batteries, Embodiment 1 is not limited thereto. The batteries that the vehicles 800 and 900 include may be any type of storage batteries and may be, for example, lead-acid storage batteries or nickel metal hydride batteries.

Modified Example 11 of Embodiment 1

Although, in Embodiment 1, it was described that, in the standard mode, a predetermined standard velocity was set to the vehicle 800 or 900, Embodiment 1 is not limited thereto. In the standard mode, a predetermined standard acceleration may be further set to the vehicle 800 or 900. In addition, in the standard mode, a predetermined standard deceleration may be further set to the vehicle 800 or 900.

In addition, Embodiment 1 is not limited to the above configurations, and, in the standard mode, a predetermined standard angular velocity may be further set to the vehicle 800 or 900 as the amount of change per unit time in an azimuth angle, which indicates a traveling direction of the vehicle 800 or 900, at the time of change in direction. In addition, in the standard mode, a predetermined standard angular acceleration may be further set to the vehicle 800 or 900, and a predetermined standard angular deceleration may be further set to the vehicle 800 or 900.

Although, in Modified Example 6 of Embodiment 1, it was described that, in the high-velocity mode, the high velocity, which is a velocity higher than the standard velocity, was set to the vehicle 800 or 900, Embodiment 1 is not limited thereto. In the high-velocity mode, an acceleration that is larger than the standard acceleration may be further set to the vehicle 800 or 900, and a deceleration that is larger than the standard deceleration may be further set to the vehicle 800 or 900. In addition, in the high-velocity mode, an angular velocity that is higher than the standard angular velocity may be further set to the vehicle 800 or 900, and an angular acceleration and an angular deceleration that are larger than the standard angular acceleration and the standard angular deceleration, respectively, may be further set to the vehicle 800 or 900.

Although, in Modified Example 6 of Embodiment 1, it was described that, in the low-velocity mode, the low velocity, which is a velocity lower than the standard velocity, was set to the vehicle 800 or 900, Embodiment 1 is not limited thereto. In the low-velocity mode, an acceleration and a deceleration that are smaller than the standard acceleration may be further set to the vehicle 800 or 900. In addition, in the low-velocity mode, an angular velocity that is lower than the standard angular velocity may be further set to the vehicle 800 or 900, and an angular acceleration and an angular deceleration that are smaller than the standard angular acceleration and the standard angular deceleration, respectively, may be further set to the vehicle 800 or 900.

Modified Example 12 of Embodiment 1

Although, in Embodiment 1, it was described that the more appropriate a candidate of movement control information was, the higher an evaluation value of the candidate was determined to be, Embodiment 1 is not limited thereto. The more appropriate a candidate of movement control information is, the lower an evaluation value of the candidate may be determined to be.

In this case, in step S12 in FIG. 3, the generator 120 of the control device 100 may select a candidate in any manner, provided that the generator 120 preferentially selects a candidate for which a lower evaluation value is determined over a candidate for which a higher evaluation value is determined. For example, the generator 120 is required to select a candidate for which the lowest evaluation value is determined as movement control information of the vehicle 800 or 900. In addition, in step S14, the generator 120 is required to select the vehicle 800 as the vehicle caused to transport an ordered item when an evaluation value of movement control information of the vehicle 800 is less than or equal to an evaluation value of movement control information of the vehicle 900.

Modified Example 13 of Embodiment 1

Although, in Embodiment 1, it was described that the generator 120 of the control device 100 selected a candidate for which the highest evaluation value was determined as movement control information of the vehicle 800 or 900, Embodiment 1 is not limited thereto. The generator 120 may select a candidate in any manner, provided that the generator 120 preferentially selects a candidate for which a higher evaluation value is determined over a candidate for which a lower evaluation value is determined. For example, the generator 120 may select one candidate from among one or a plurality of candidates for which evaluation values higher than a predetermined evaluation value are determined, based on a predetermined rule or software-generated random numbers.

Modified Example 14 of Embodiment 1

Although, in Embodiment 1, it was described that the start location of transportation was a location of an entrance to a store in which the terminal device 300 was installed, Embodiment 1 is not limited thereto. The start location of transportation according to the present modified example is a location of an entrance to a store that is specified by an orderer.

For this purpose, the acquirer 110 of the control device 100 according to the present modified example acquires an order request including a store ID identifying a store specified by the orderer, an item ID of an item sold at the store, and transportation destination information indicating a transportation destination of the item, in step S01 in FIG. 3. Next, the acquirer 110 transfers the order request by outputting the order request to the data communication circuit 104 with the terminal device 300 or a not-illustrated terminal device that is installed in the store identified by the store ID as the destination.

Further, the acquirer 110 of the control device 100 acquires preparation information and total information that the information storage 190 stores in advance in association with the store ID and the item ID acquired from the order request, in step S22 in FIG. 6. In this way, preparation information indicating preparation time of the item sold at the store specified by the orderer and total information indicating total time of the preparation time and longest allowable time are acquired.

In addition, the acquirer 110 of the control device 100 acquires start location information that the information storage 190 stores in advance in association with the store ID, in step S23. In this way, start location information indicating a start location at which transportation of the item sold at the store specified by the orderer is started is acquired.

Modified Example 15 of Embodiment 1

Although, in Embodiment 1, it was described that a target of an order was a commercial item, Embodiment 1 is not limited thereto. The target of an order may be any object and may be, for example, an object that does not serve as a target of a commercial transaction. In addition, the target of an order may be, instead of an object, a living thing.

Although, in Embodiment 1, it was described that an item was food and drink, Embodiment 1 is not limited thereto, and an item may be an object different from food and drink, such as a book and an electric appliance. In addition, although, in Embodiment 1, it was described that the start location of transportation was a location of an entrance to a store that sells ordered food and drink, Embodiment 1 is not limited thereto. The start location of transportation may be any location, provided that the location is a location at which the vehicles 800 and 900 can come to a stop or park or a location at which the vehicle 700 can land, and may be, for example, a location of a shipping door of a warehouse in which an ordered item is stored.

In addition, although, in Embodiment 1, it was described that the transportation destination was an entrance to an apartment where a recipient or a substitute lived, Embodiment 1 is not limited thereto. The transportation destination may be any location, provided that the location is a location at which the vehicles 800 and 900 can come to a stop or park or a location at which the vehicle 700 can land.

The location at which the vehicles 800 and 900 can come to a stop or park may be, for example, an entrance of an apartment complex, an office building, a hotel, a commercial facility, or a public facility or an entranceway of a house. The location at which the vehicles 800 and 900 can come to a stop or park may also be a lobby of an apartment complex, an office building, a hotel, a commercial facility, or a public facility, a yard of a house, an apartment complex, an office building, a hotel, a commercial facility, or a public facility, a parking lot, a river beach, or a park.

The location at which the vehicle 700 can land may be, in addition to the location at which the vehicles 800 and 900 can come to a stop or park, a veranda or a rooftop of a house, an apartment complex, an office building, a hotel, a commercial facility, or a public facility.

In addition, when the vehicles 800 and 900 arrive at the start location of transportation, the vehicles 800 and 900 may, instead of coming to a stop or parking at the start location, circle or travel back and forth in a vicinity of the start location at a predetermined velocity. The vicinity of the start location of transportation means a region on the start location side of a boundary line that is located a predetermined distance D1 away from the start location (where D1 is a positive number). In addition, the vehicles 800 and 900 may once stop at a location within the vicinity of the start location of transportation and thereafter circle or travel back and forth in the vicinity of the start location of transportation, may circle or travel back and forth and thereafter stop, or may repeat stopping and circling or traveling back and forth.

Further, when the vehicle 700 arrives at the start location of transportation or a transportation destination, the vehicle 700 may, instead of landing at the start location or the transportation destination, circle or travel back and forth in a vicinity of the start location or a vicinity of the transportation destination at a velocity less than or equal to a predetermined velocity or may perform hovering flight at an altitude within a predetermined range. The vicinity of the start location or the vicinity of the transportation destination means an airspace on the start location side or the transportation destination side of a boundary line that is located a predetermined distance away from the start location or the transportation destination.

Modified Example 16 of Embodiment 1

In the present embodiment, it was described that the vehicles 800 and 900 were unmanned ground vehicles. In addition, in Modified Examples 9 of Embodiment 1, it was described that the vehicle 700 was an unmanned aircraft. However, each of the vehicles 700, 800, and 900 is not necessarily unmanned, and provided that, with the exception of control by the control device 100, the vehicle is an object that autonomously moves, a person may be on board the vehicle.

Modified Example 17 of Embodiment 1

Although, in the present embodiment, it was described that the control device 100 included the information storage 190, the present embodiment is not limited thereto. The control device 100 according to the present modified example does not include the information storage 190. The control device 100 according to the present modified example is connected to a not-illustrated information storage device that is, for example, a network attached storage (NAS) and that has the same functions as the functions of the information storage 190, via the Internet IN, and performs the movement control processing illustrated in FIG. 3, the information acquisition processing illustrated in FIG. 6, and the evaluation value calculation processing illustrated in FIG. 7, using information stored in the information storage device. The transportation system 1 according to the present modified example may include an information storage device or does not have to include an information storage device.

Modified Example 18 of Embodiment 1

Although, in the embodiment, it was described that the transportation system 1 included the control device 100, the embodiment is not limited to the configuration, and the transportation system 1 does not have to include the control device 100. In this case, the movement control processing illustrated in FIG. 3, the information acquisition processing illustrated in FIG. 6, and the evaluation value calculation processing illustrated in FIG. 7 may be executed by the CPU 891 of the control device 890 that the vehicle 800 includes. Therefore, the CPU 891 of the vehicle 800 may function as not-illustrated functional units equivalent to the acquirer 110, the generator 120, the selector 130, and the controller 140 of the control device 100. In addition, the flash memory 893b of the vehicle 800 may function as a not-illustrated functional unit equivalent to the information storage 190 of the control device 100.

Embodiment 2

In Embodiment 1, it was described that, in step S06 in FIG. 3, the generator 120 of the control device 100 selected, from among a plurality of entire routes starting from the location of the vehicle 800 or 900 and reaching the start location of transportation, N movement routes each of which, when the vehicle 800 moved at the standard velocity, required movement time greater than or equal to preparation time and less than or equal to total time for the vehicle 800 to pass through the route, as movement routes.

However, the present disclosure is not limited to the above description, and a generator 120 of a control device 100 according to the present embodiment selects N entire routes in total including entire routes each of which, when a vehicle 800 moves at a standard velocity, requires movement time shorter than preparation time for the vehicle 800 to pass through the route and entire routes each of which, when the vehicle 800 moves at the standard velocity, requires movement time greater than or equal to the preparation time and less than or equal to total time for the vehicle 800 to pass through the route, as movement routes. Although constituent components that are the same as those in Embodiment 1 are described below using the same reference signs as the reference signs used in Embodiment 1, differences between the present embodiment and Embodiment 1 are mainly described.

For this purpose, the generator 120 of the control device 100 according to the present embodiment searches for a plurality of entire routes starting from a location of the vehicle 800 or 900 and reaching a start location of transportation and calculates movement times with respect to a plurality of found entire routes, in step S06. Next, the generator 120 selects, from among the plurality of found entire routes, N entire routes the calculated movement times of which are less than or equal to the total time, as movement routes. Subsequently, the generator 120 assigns numbers of 1 to N, which indicates the first to the N-th, respectively, to the N movement routes.

Subsequently, the generator 120 of the control device 100 determines an evaluation value with respect to the n-th candidate of movement control information, based on the amount of energy that is estimated to be consumed by the vehicle 800 or 900, in step S44 in FIG. 7. Next, the generator 120 determines whether or not preparation time indicated by preparation information acquired in step S22 in FIG. 6 is less than or equal to the movement time calculated with respect to the candidate.

On this occasion, when the generator 120 determines that the preparation time is less than or equal to the movement time, the generator 120 determines that, when the vehicle 800 or 900 arrives at the start location of transportation in the case where the vehicle 800 or 900 moves along a movement route included in the candidate at the standard velocity, preparation of an item to be transported has been completed. Thus, the generator 120 determines that preparation waiting time from when the vehicle 800 or 900 arrives at the start location of transportation to when the preparation of the item to be transported is completed is 0 minutes. In contrast, when the generator 120 determines that the preparation time is longer than the movement time, the generator 120 calculates preparation waiting time by subtracting the preparation time from the movement time. The generator may calculate preparation waiting time by subtracting an arrival time from a preparation completion time.

Next, the generator 120 of the control device 100 calculates a correction value for the evaluation value of the n-th candidate, based on the calculated preparation waiting time. The correction value calculated in the present embodiment is used for correction of an evaluation value by means of addition. Thus, the generator 120, by, for example, using an inverse of a value obtained by adding a predetermined positive constant to the preparation waiting time as a correction value, calculates a correction value in such a manner that the shorter the preparation waiting time is, the higher the correction value becomes. The reason why a positive constant is added to the preparation waiting time is to enable a correction value to be calculated even when the preparation waiting time is 0 minutes. Although, in the present embodiment, a correction value is calculated as an inverse of a value obtained by adding a positive constant to the preparation waiting time, the method for calculating a correction value is not limited thereto.

Next, an acquirer 110 of the control device 100 acquires a positive weighting factor for a correction value, which an information storage 190 stores in advance. Subsequently, the generator 120 weights the calculated correction value by the acquired weighting factor and adds the weighted correction value to the evaluation value calculated in step S44. Since, in the present embodiment, the shorter the preparation waiting time is, the higher the correction value is calculated, the shorter the preparation waiting time is, the higher an evaluation value after correction is determined to be than the value before correction.

According to the above-described configuration, the generator 120 of the control device 100 determines an evaluation value that is based on the amount of energy that is estimated to be consumed by the vehicle 800 or 900 in a case in which the vehicle 800 or 900 moves along a movement route and preparation waiting time, in the case, from when the vehicle 800 or 900 arrives at the start location of transportation to when preparation of an item targeted by an order is completed. Therefore, the control device 100 is capable of generating movement control information that, while suppressing a delay in start of transportation, suppresses an increase in the amount of energy that the vehicle 800 or 900 consumes to move to the start location of transportation.

In addition, according to the above-described configuration, the generator 120 of the control device 100 determines an evaluation value in such a manner that the shorter the preparation waiting time from when the vehicle 800 or 900 arrives at the start location of transportation to when the preparation of an ordered item is completed is, the higher the evaluation value becomes. Since an increase of time from when the vehicle 800 or 900 arrives at the start location of transportation to when transportation of an item is started can thus be suppressed, it is possible to generate movement control information that suppresses a reduction of use efficiency of the start location of transportation.

In the present embodiment, the use efficiency of the start location of transportation is calculated by dividing area of a region that a person who uses a neighborhood of the start location can use by area of the entire region included in the neighborhood. In addition, the region included in a neighborhood of the start location means a region on the start location side of a boundary line that is located a predetermined distance D2 away from the start location (where D2 is a positive number). Although, in the present embodiment, the distance D2 defining a neighborhood of the start location is shorter than distance D1 defining a vicinity of the start location, the present embodiment is not limited thereto. The distance D2 may be equal to the distance D1 or may be longer than the distance D1.

In addition, in the present embodiment, since the start location of transportation is a location of an entrance to a store that sells an ordered item, a region included in the neighborhood of the start location includes a region in the entrance to the store. Further, the area of a region that a person who uses a neighborhood of the start location can use includes, for example, area of a region in which no object including the vehicles 800 and 900 is placed. This configuration enables the control device 100 to suppress an increase in a period during which the vehicle 800 or 900 obstructs or may obstruct passage of persons who go in and out of the store, including a customer or an employee.

Although, in the present embodiment, it was described that the generator 120 of the control device 100 determined a correction value in such a manner that the shorter the preparation waiting time was, the higher the correction value became, the present embodiment is not limited thereto. The generator 120 may, by, for example, using a value obtained by adding a predetermined constant to the preparation waiting time as a correction value, calculate a correction value in such a manner that the shorter the preparation waiting time is, the lower the correction value becomes. In addition, the generator 120 may weight the correction value calculated based on the preparation waiting time by a positive weighting factor and thereafter subtract the weighted correction value from the evaluation value determined in step S44.

Modified Example 1 of Embodiment 2

Although, in Embodiment 2, it was described that the generator 120 of the control device 100 determined an evaluation value, based on the amount of energy that was estimated to be consumed by the vehicle 800 or 900 and preparation waiting time at the start location of transportation, in step S44 in FIG. 7, Embodiment 2 is not limited thereto.

The generator 120 of the control device 100 according to the present modified example determines an evaluation value, based on the amount of energy that is estimated to be consumed by the vehicle 800 or 900, preparation waiting time at the start location of transportation, and whether or not a standby position is provided at a location within a vicinity of the start location of transportation. Although, in the present modified example, the standby position is a parking spot at which the vehicles 800 and 900 are permitted to stop or park, Embodiment 2 is not limited thereto, and the standby position may be any position, provided that the position is a position at which the vehicles 800 and 900 can stop or park.

For this purpose, the acquirer 110 of the control device 100 acquires start location information indicating the start location of transportation in step S23 in FIG. 6 and thereafter acquires a standby position flag indicating whether or not a standby position for the vehicles 800 and 900 to stand by exists in a vicinity of the start location, from the information storage 190. In addition, the acquirer 110 acquires information indicating a location of the standby position in latitude, longitude, and altitude from the information storage 190. In the present modified example, the information indicating a standby position flag and a location of a standby position is stored by the information storage 190 in advance.

Subsequently, the generator 120 of the control device 100 determines an evaluation value with respect to the n-th candidate of movement control information, based on the amount of energy that is estimated to be consumed by the vehicle 800 or 900, in step S44 in FIG. 7. Next, when the acquired standby position flag indicates that no standby position exists, the generator 120, by executing the process described in Embodiment 2, calculates preparation waiting time and calculates a correction value, based on the calculated preparation waiting time. Since the correction value calculated in the present modified example is used for correction of an evaluation value by means of addition, the shorter the preparation waiting time is, the higher the correction value is calculated.

In contrast, when the acquired standby position flag indicates that a standby position exists, the generator 120 of the control device 100 calculates a maximum correction value that is calculated when the preparation waiting time is 0 minutes. The reason why such a correction value is calculated is that, when the vehicle 800 or 900 stands by at the standby position until preparation of an ordered item is completed, the use efficiency of the start location of transportation is not reduced.

Subsequently, the generator 120 of the control device 100, as with Embodiment 2, weights the calculated correction value by a positive weighting factor and corrects the evaluation value by adding the weighted correction value to the evaluation value. In the present modified example, when a standby position exists at the start location of transportation, a weighted maximum correction value is added to the evaluation value. Subsequently, the generator 120 terminates the execution of the evaluation value calculation processing.

Subsequently, the generator 120 of the control device 100 generates movement control information of the vehicles 800 and 900, based on the corrected evaluation values, in step S12 in FIG. 3. In addition, the selector 130 selects the vehicle 800 or 900, based on the corrected evaluation values, in step S14. Next, the generator 120 adds information indicating the preparation waiting time to the movement control information of the selected vehicle 800 or 900, in step S15.

Subsequently, the generator 120 of the control device 100 determines whether or not the preparation waiting time is longer than 0 minutes. On this occasion, when the generator 120 determines that the preparation waiting time is longer than 0 minutes, the generator 120 determines whether or not a standby position exists at a location within a vicinity of the start location of transportation, based on the standby position flag. When the generator 120 determines that a standby position exists, the generator 120, by executing the same processing as the processing in step S06 in FIG. 3, searches for a shortest entire route starting from the start location of transportation and reaching the standby position (hereinafter, referred to as a standby route). Next, the generator 120 adds information indicating the standby route to the movement control information of the vehicle 800 or 900.

In contrast, when it is determined that the preparation waiting time is 0 minutes, when it is determined that no standby position exists, or after information indicating a standby route has been added to the movement control information, the controller 140 of the control device 100 outputs the movement control information to the data communication circuit 104 with the vehicle 800 or 900 as the destination. Through this processing, when it is determined that the preparation waiting time is 0 minutes, the controller 140 performs, on the vehicle 800 or 900, control to cause the vehicle 800 or 900 to move to the start location of transportation. In addition, when the preparation waiting time is longer than 0 minutes and no standby position exists at a location within a vicinity of the start location of transportation, the controller 140 performs, on the vehicle 800 or 900, control to cause the vehicle 800 or 900 to move to the start location of transportation and control to cause the vehicle 800 or 900 to stand by at the start location for the preparation waiting time in sequence. Further, when the preparation waiting time is longer than 0 minutes and a standby position exists at a location within a vicinity of the start location of transportation, the controller 140 performs, on the vehicle 800 or 900, control to cause the vehicle 800 or 900 to move to the start location of transportation, control to cause the vehicle 800 or 900 to move from the start location to the standby position, control to cause the vehicle 800 or 900 to stand by at the standby position for the preparation waiting time, and control to cause the vehicle 800 or 900 to move from the standby position to the start location in sequence.

Since functions of the vehicle 900 according to the present modified example are the same as the functions of the vehicle 800, the vehicle 800 is mainly described below. The CPU 891 of the vehicle 800 acquires movement control information received from the control device 100, acquires information indicating a movement route and information indicating preparation waiting time from the acquired movement control information, and thereafter tries acquisition of information indicating a standby route, in step S51 in FIG. 10.

On this occasion, when information indicating a standby route is acquired, the CPU 891 of the vehicle 800 executes the processing in steps S52 to S54, based on the information indicating the movement route. Through this processing, the vehicle 800 moves along the movement route to the start location of transportation. When the CPU 891 of the vehicle 800 determines that the vehicle 800 has arrived at the start location of transportation (step S54: Yes), the CPU 891 executes the same processing as the processing in steps S52 to S54, based on the information indicating the standby route. Through this processing, the vehicle 800 moves in the forward direction along the standby route from the start location of transportation to the standby position.

Subsequently, the CPU 891 of the vehicle 800 outputs a control signal to cause the vehicle 800 to come to a stop or park to the drive circuit 899 and thereafter starts timing. Next, when the CPU 891 of the vehicle 800 determines that the timed period has exceed the preparation waiting time, the CPU 891 executes processing similar to the processing in steps S52 to S54, based on the information indicating the standby route. Through this processing, the vehicle 800 moves in the reverse direction along the standby route from the standby position to the start location. Subsequently, the, CPU 891 executes the processing in step S55 and thereafter terminates the execution of the movement processing.

In this way, when information indicating a standby route is acquired from movement control information, the vehicle 800, in accordance with the movement control information, arrives at the start location of transportation before preparation of an item is completed, moves from the start location to the standby position, stands by at the standby position until the preparation of the item is completed, and thereafter moves from the standby position to the start location.

In contrast, when no information indicating a standby route is acquired, the vehicle 800, by performing the processing in steps S52 to S54, moves along a movement route to the start location of transportation. When the vehicle 800 determines that the vehicle 800 has arrived at the start location of transportation, the vehicle 800 comes to a stop or parks at the start location of transportation and thereafter starts timing. Subsequently, when the CPU 891 of the vehicle 800 determines that the timed period has exceeded the preparation waiting time, the CPU 891 executes the processing in step S55 and thereafter terminates the execution of the movement processing.

In this way, when no information indicating a standby route is acquired from the movement control information and the preparation waiting time is longer than 0 minutes, the vehicle 800, in accordance with the movement control information, arrives at the start location of transportation before preparation of an item is completed and stands by at the start location of transportation until the preparation of the item is completed. In contrast, when no information indicating a standby route is acquired from the movement control information and the preparation waiting time is 0 minutes, the vehicle 800 arrives at the start location of transportation when preparation of an item is completed or after the preparation has been completed.

According to the above-described configuration, the generator 120 of the control device 100 determines, for each of N candidates of movement control information, an evaluation value that is based on whether or not a standby position for the vehicles 800 and 900 to stand by exists at a location within a vicinity of the start location, located at a distance shorter than the predetermined distance D1 from the start location of transportation. Therefore, the control device 100 is capable of generating movement control information that suppresses a reduction in the use efficiency of the start location of transportation.

In the present modified example, it was described that the generator 120 of the control device 100 calculated a correction value in such a manner that the shorter the preparation waiting time was, the higher the correction value became. However, Embodiment 2 is not limited to the configuration, and the generator 120 may calculate a correction value in such a manner that the shorter the preparation waiting time is, the lower the correction value becomes. In addition, when a standby position flag indicates that a standby position exists, the generator 120 may calculate a minimum correction value. Further, the generator 120 may weight the calculated correction value by a positive weighting factor and thereafter subtract the weighted correction value from the evaluation value.

Modified Example 2 of Embodiment 2

Modified Example 14 of Embodiment 1 in which the start location of transportation is a location of an entrance to a store specified by an orderer and Modified Example 1 of Embodiment 2 in which an evaluation value of a candidate of movement control information is determined based on whether or not a standby position exists at a location within a vicinity of the start location of transportation can be combined.

In this case, the acquirer 110 of the control device 100 is required to acquire a store ID from an order request and acquire a standby position flag that the information storage 190 stores in advance in association with the acquired store ID. In the present modified example, the standby position flag associated with a store ID is a flag indicating whether or not a standby position for the vehicles 800 and 900 to stand by exists at a location within a vicinity of a store identified by the store ID.

In addition, in this case, the acquirer 110 of the control device 100 is required to acquire information indicating a location of a standby position that the information storage 190 stores in advance in association with the acquired store ID. In the present modified example, the information indicating the location of a standby position associated with a store ID is information indicating the location of a standby position that exists at a location within a vicinity of a store identified by the store ID in latitude, longitude, and altitude.

Modified Example 3 of Embodiment 2

Although, in Modified Example 1 of Embodiment 2, it was described that the generator 120 of the control device 100 determined an evaluation value, based on whether or not a standby position existed at a location within a vicinity of the start location of transportation, Embodiment 2 is not limited thereto.

The generator 120 of the control device 100 may determine an evaluation value, based on whether or not the start location of transportation is the location of a standby position. That is, the generator 120 may determine an evaluation value, based on whether or not a standby position exists at the start location of transportation. In addition, the generator 120 may determine an evaluation value, based on whether a standby position exists at the start location of transportation or a location within a vicinity of the start location or whether a standby position exists at neither the start location of transportation nor a location within a vicinity of the start location.

Modified Example 4 of Embodiment 2

Although, in Modified Example 1 of Embodiment 2, it was described that, since a correction value calculated by the generator 120 of the control device 100 was used for correction of an evaluation value by means of addition, a maximum correction value was calculated when a standby position existed at a location within a vicinity of the start location of transportation, Embodiment 2 is not limited thereto.

The correction value according to the present modified example is the same as the correction value according to Modified Example 1 of Embodiment 2 in that the correction value is used for correction of an evaluation value by means of addition. However, the correction value according to the present modified example differs from the correction value according to Modified Example 1 of Embodiment 2 in that, when a standby position exists at a location within a vicinity of the start location of transportation, the correction value according to the present modified example is calculated higher than a correction value calculated when no standby position exists at a location within the vicinity of the start location.

For this purpose, when a standby position flag indicates that no standby position exists, the generator 120 of the control device 100, for example, uses an inverse of a value obtained by adding a predetermined positive constant C1 to preparation waiting time as a correction value. The reason why a positive constant C1 is added to preparation waiting time is to enable a correction value to be calculated even when the preparation waiting time is 0 minutes.

In contrast, when a standby position flag indicates that a standby position exists, the generator 120 of the control device 100 corrects preparation waiting time to a shorter time than the preparation waiting time before correction by, for example, multiplying the preparation waiting time by a predetermined positive constant C2 that is smaller than a value of 1. Subsequently, the generator 120 uses an inverse of a value obtained by adding the predetermined positive constant C1 to the corrected preparation waiting time as a correction value. In this way, if lengths of preparation waiting times are the same, a correction value calculated when a standby position exists at a location within a vicinity of the start location of transportation is calculated higher than a correction value calculated when no standby position exists at a location within the vicinity of the start location.

Subsequently, the generator 120 of the control device 100, as with Modified Example 1 of Embodiment 2, weights the calculated correction value by a positive weighting factor and corrects the evaluation value by adding the weighted correction value to the evaluation value.

In the present modified example, it was described that, when a standby position existed at a location within a vicinity of the start location of transportation, the generator 120 of the control device 100 calculated a higher correction value than a correction value calculated when no standby position existed at a location within the vicinity of the start location. However, Embodiment 2 is not limited to the configuration, and, when a standby position exists at a location within the vicinity of the start location, the generator 120 may calculate a lower correction value than a correction value calculated when no standby position exists.

For this purpose, when a standby position flag indicates that no standby position exists, the generator 120 of the control device 100, for example, uses a value obtained by adding a predetermined constant C3 to preparation waiting time as a correction value. In contrast, when a standby position flag indicates that a standby position exists, the generator 120 corrects preparation waiting time to a shorter time than the preparation waiting time before correction by multiplying the preparation waiting time by a predetermined positive constant C4 that is smaller than a value of 1. Next, the generator 120 uses a value obtained by adding the constant C3 to the corrected preparation waiting time as a correction value. In this way, if lengths of preparation waiting times are the same, a correction value calculated when a standby position exists at a location within a vicinity of the start location of transportation is calculated lower than a correction value calculated when no standby position exists at a location within the vicinity of the start location. Subsequently, the generator 120 weights the calculated correction value by a positive weighting factor and corrects the evaluation value by subtracting the weighted correction value from the evaluation value.

Modified Example 5 of Embodiment 2

Although, in Modified Example 1 of Embodiment 2, it was described that the controller 140 of the control device 100 performed, on the vehicle 800 or 900, control to cause the vehicle 800 or 900 to stand by at the start location or a standby position existing at a location within a vicinity of the start location for preparation waiting time, Embodiment 2 is not limited thereto.

The controller 140 of the control device 100 may perform, on the vehicle 800 or 900, control to cause the vehicle 800 or 900 to stand by at a standby position existing at a location indicated by vehicle location information (hereinafter, referred to as a start location of movement) or a location within a vicinity of the start location of movement for preparation waiting time. In this case, the generator 120 of the control device 100 may determine an evaluation value based on the amount of energy that is estimated to be consumed by the vehicle 800 or 900, whether or not a standby position is provided at a start location of movement indicated by the vehicle location information or a location within a vicinity of the start location of movement, and preparation waiting time at the standby position.

In addition, the controller 140 of the control device 100 may perform, on the vehicle 800 or 900, control to cause the vehicle 800 or 900 to stand by at a standby position existing at a location on a movement route from the start location of movement of the vehicle 800 or 900 to the start location of transportation (hereinafter, referred to as an intermediate location) or a location within a vicinity of the intermediate location for preparation waiting time.

Further, the generator 120 of the control device 100 may identify, based on a standby position flag, one or a plurality of locations at which standby positions exist from among two or more of a start location of movement and a location within a vicinity of the start location of movement, an intermediate location and a location within a vicinity of the intermediate location, and a start location of transportation and a location within a vicinity of the start location of transportation. In this case, the selector 130 may select, from among standby positions that respectively exist at the identified one or plurality of locations, a position at which the vehicle 800 or 900 is caused to stand by, based on a predetermined rule or software-generated random numbers. In addition, the controller 140 may perform, on the vehicle 800 or 900, control to cause the vehicle 800 or 900 to stand by at the selected position for preparation waiting time.

Embodiment 1, Modified Examples 1 to 18 of Embodiment 1, and Modified Examples 1 to 5 of Embodiment 2 of the present disclosure can be combined with one another. That is, the generator 120 of the control device 100 may determine an evaluation value of a candidate of movement control information, based on any one or more of the estimated amount of consumed energy, preparation waiting time, start waiting time, allowed time, longest allowable time, and whether or not a standby position exists at the start location of transportation or a location within a vicinity of the start location of transportation.

It is possible to provide the present disclosure as not only the control device 100 that includes a configuration for achieving the functions according to any one of Embodiment 1, Modified Examples 1 to 17 of Embodiment 1, Embodiment 2, and Modified Examples 1 to 5 of Embodiment 2 and the control device 890 that includes a configuration for achieving the functions according to Modified Example 18 of Embodiment 1 but also a system that is constituted by a plurality of devices and that includes, as a whole system, a configuration for achieving the functions according to any one of Embodiment 1, Modified Examples 1 to 18 of Embodiment 1, Embodiment 2, and Modified Examples 1 to 5 of Embodiment 2 of the present disclosure.

It is possible to provide the present disclosure as the control device 100 that includes, in advance, a configuration for achieving the functions according to any one of Embodiment 1, Modified Examples 1 to 17 of Embodiment 1, Embodiment 2, and Modified Examples 1 to 5 of Embodiment 2 of the present disclosure. It is also possible to, by applying a program, cause an existing control device to function as the control device 100 according to any one of Embodiment 1, Modified Examples 1 to 17 of Embodiment 1, Embodiment 2, and Modified Examples 1 to 5 of Embodiment 2 of the present disclosure. That is, it is possible to, by a computer (CPU or the like) that controls an existing control device executing a program for achieving various functional configurations of the control device 100 exemplified in any one of Embodiment 1, Modified Examples 1 to 17 of Embodiment 1, Embodiment 2, and Modified Examples 1 to 5 of Embodiment 2 of the present disclosure, cause the existing control device to function as the control device 100 according any one of Embodiment 1, Modified Examples 1 to 17 of Embodiment 1, Embodiment 2, and Modified Examples 1 to 5 of Embodiment 2 of the present disclosure.

It is possible to provide the present disclosure as the control device 890 that includes, in advance, a configuration for achieving the functions according to Modified Example 18 of Embodiment 1 of the present disclosure. It is also possible to, by applying a program, cause an existing control device to function as the control device 890 according to Modified Example 18 of Embodiment 1. That is, it is possible to, by a computer (CPU or the like) that controls an existing control device executing a program for achieving various functional configurations of the control device 890 exemplified in Modified Example 18 of Embodiment 1, cause the existing control device to function as the control device 890 according to Modified Example 18 of Embodiment 1.

Any distribution method of such programs can be used, and the programs can be stored and distributed in a recording medium, such as a memory card, a compact disc (CD)-ROM, and a digital versatile disc (DVD)-ROM, or can be distributed via a communication medium, such as the Internet.

A method according to the present disclosure can be implemented using the control device 100 according to any one of Embodiment 1, Modified Examples 1 to 17 of Embodiment 1, Embodiment 2, and Modified Examples 1 to 5 of Embodiment 2 of the present disclosure and the control device 890 according to Modified Example 18 of Embodiment 1. In addition, the method according to the present disclosure can be implemented using the transportation system 1 according to any one of Embodiment 1, Modified Examples 1 to 18 of Embodiment 1, Embodiment 2, and Modified Examples 1 to 5 of Embodiment 2 of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

Appendices

Appendix 1

A control device including:

an acquirer that, when an order is accepted, acquires vehicle location information indicating a location of a vehicle capable of storing a target of the order, start location information indicating a start location at which transportation of the target is started, and preparation information indicating preparation time required for preparation to bring a state of the target into a state where the transportation is startable or a preparation completion time at which the preparation is completed; and a generator that generates movement control information for causing the vehicle to move from the location of the vehicle to the start location, based on (i) an amount of energy that the vehicle is estimated to consume to move from the location indicated by the acquired vehicle location information to the start location indicated by the acquired start location information and (ii) the preparation time or the preparation completion time indicated by the acquired preparation information.

Appendix 2

The control device according to Appendix 1, wherein the generator generates a plurality of candidates of the movement control information each of which includes a movement route starting from the location of the vehicle and reaching the start location, determines, for each of the plurality of generated candidates, an evaluation value that is based on the amount of energy that the vehicle is estimated to consume when the vehicle moves along the movement route, and generates the movement control information by selecting a candidate from among the plurality of candidates based on the determined evaluation values.

Appendix 3

The control device according to Appendix 2, wherein the generator determines the evaluation value that is further based on preparation waiting time, in a case in which the vehicle moves along the movement route, from when the vehicle arrives at the start location to when the preparation is completed.

Appendix 4

The control device according to Appendix 2 or 3, wherein each of the plurality of candidates further includes an operation mode of the vehicle at a time of movement along the movement route, and the generator determines, for each of the plurality of candidates, the evaluation value that is based on the amount of energy that is estimated to be consumed by the vehicle when the vehicle moves along the movement route in the operation mode.

Appendix 5

The control device according to any one of Appendices 2 to 4, wherein the generator determines, for each of the plurality of candidates, the evaluation value that is further based on whether or not a standby position exists at the start location or a location within a vicinity of the start location, located at a distance shorter than a predetermined distance from the start location, the standby position being a position for the vehicle to stand by.

Appendix 6

The control device according to any one of Appendices 2 to 5, wherein the generator determines, for each of the plurality of candidates, the evaluation value that is further based on start waiting time from when the preparation is completed to when the transportation is started.

Appendix 7

The control device according to any one of Appendices 2 to 6, wherein the acquirer further acquires start information indicating a start time limit of the transportation of the target, and the generator determines, for each of the plurality of candidates, the evaluation value that is further based on the start information.

Appendix 8

The control device according to any one of Appendices 2 to 7, wherein the generator estimates the amount of energy that the vehicle consumes, based on distance of the movement route.

Appendix 9

The control device according to any one of Appendices 2 to 8, wherein the generator estimates the amount of energy that the vehicle consumes, based on change in altitude of the vehicle occurring while the vehicle moves along the movement route.

Appendix 10

The control device according to any one of Appendices 2 to 9, wherein the generator generates the movement control information for each of a plurality of vehicles, and the control device further includes a selector that selects a vehicle caused to transport the target from among the plurality of vehicles, based on the evaluation value used for generation of the movement control information.

Appendix 11

The control device according to Appendix 10 further including a controller that performs, on the selected vehicle, control to cause the selected vehicle to move from a location of the selected vehicle to the start location, based on the movement control information.

Appendix 12

The control device according to Appendix 1, wherein the generator generates the movement control information by (i) generating a plurality of candidates of the movement control information, (ii) determining an evaluation value for each of the plurality of generated candidates, and, (iii) based on the determined evaluation values, selecting a candidate from among the plurality of candidates, each of the plurality of candidates includes a movement route that is a route starting from the location of the vehicle and reaching the start location and that causes movement time of the vehicle to be greater than or equal to the preparation time or causes an arrival time of the vehicle at the start location to be later than or
equal to the preparation completion time, and
the generator determines the evaluation value, based on
the amount of energy that the vehicle is estimated to
consume when the vehicle moves along the movement
route.
Appendix 13
The control device according to Appendix 1, wherein
the generator generates the movement control information
by (i) generating a plurality of candidates of the move-
ment control information, (ii) determining an evalua-
tion value for each of the plurality of generated candi-
dates, and, (iii) based on the determined evaluation
values, selecting a candidate from among the plurality
of candidates,
each of the plurality of candidates includes a movement
route starting from the location of the vehicle and
reaching the start location, and
the generator determines the evaluation value, based on
the amount of energy that the vehicle is estimated to
consume in a case in which the vehicle moves along the
movement route and preparation waiting time, in the
case, from when the vehicle arrives at the start location
to when the preparation is completed.
Appendix 14
A system including:
a vehicle capable of storing a target of an order;
an acquirer that, when the order is accepted, acquires
vehicle location information indicating a location of the
vehicle, start location information indicating a start
location at which transportation of the target is started,
and preparation information indicating preparation
time required for preparation to bring a state of the
target into a state where the transportation is startable
or a preparation completion time at which the prepa-
ration is completed; and
a generator that generates movement control information
for causing the vehicle to move from the location of the
vehicle to the start location, based on (i) an amount of
energy that the vehicle is estimated to consume to move
from the location indicated by the acquired vehicle
location information to the start location indicated by
the acquired start location information, and (ii) the
preparation time or the preparation completion time
indicated by the acquired preparation information.
Appendix 15
A method that a control device or a system executes, the
method including steps of:
when an order is accepted, acquiring vehicle location
information indicating a location of a vehicle capable
of storing a target of the order, start location informa-
tion indicating a start location at which transportation
of the target is started, and preparation information
indicating preparation time required for preparation to
bring a state of the target into a state where the
transportation is startable or a preparation completion
time at which the preparation is completed; and
generating movement control information for causing the
vehicle to move from the location of the vehicle to the
start location, based on (i) an amount of energy that the
vehicle is estimated to consume to move from the
location indicated by the acquired vehicle location
information to the start location indicated by the
acquired start location information, and (ii) the preparation time or the preparation completion time indi-
cated by the acquired preparation information.

REFERENCE SIGNS LIST

1 Transportation system
100, 790, 890 Control device
101, 891 CPU
102, 892 RAM
103a, 893a ROM
103b Hard disk
104, 894 Data communication circuit
105, 895 Video card
105b, 895b Display device
105c, 895c Input device
110 Acquirer
120 Generator
130 Selector
140 Controller
190 Information storage
200, 300 Terminal device
700, 800, 900 Vehicle
701 to 704 Propeller arm
711 to 714 Propeller
721a First holding frame
721b Second holding frame
722a, 722b Guide rail
731, 831 LiDAR sensor
801, 802 Wheel
810 Chassis
820 Storage cabinet
821 Storage box
821a Door
821b Door frame
893b Flash memory
896 Location measurement circuit
897 Azimuth angle sensor
898 Input/output port
899 Driver circuit
IN Internet
What is claimed is:
1. A control device comprising:
at least one memory storing program code; and
at least one processor configured to access the program
code and operate as instructed by the program code,
wherein
the program code includes:
acquisition code configured to cause the at least one
processor to acquire, when an order is accepted, vehicle
location information indicating a location of a vehicle
capable of storing a target of the order, start location
information indicating a start location at which trans-
portation of the target is started, and preparation infor-
mation indicating preparation time required for prepa-
ration to bring a state of the target into a state where the
transportation is startable or a preparation completion
time at which the preparation is completed;
generation code configured to cause the at least one
processor to generate movement control information
for causing the vehicle to move from the location of the
vehicle to the start location, based on (i) an amount of
energy that the vehicle is estimated to consume to move
from the location indicated by the acquired vehicle
location information to the start location indicated by
the acquired start location information, and (ii) the
preparation time or the preparation completion time
indicated by the acquired preparation information, determination code configured to cause the at least one processor to determine an arrival time of the vehicle at the start location such that the arrival time does not precede completion of the preparation of the target; and controlling code configured to cause the at least one processor to control, based on a preparation waiting time being greater than a threshold time and based on a standby position being within a vicinity of the start location, the vehicle to move to the standby position, and return from the standby position to the start location based on the preparation completion time, wherein the controlling code is further configured to:
cause the at least one processor to transmit the movement control information including a movement route to the vehicle via a data communication circuit, the movement route comprising a sequence of nodes with latitude, longitude, and altitude coordinates for navigation, and
cause the vehicle to execute movement processing that generates control signals for vehicle motors based on the movement route.

2. The control device according to claim 1, wherein the generation code is configured to cause the at least one processor to
generate a plurality of candidates of the movement control information each of which includes a movement route starting from the location of the vehicle and reaching the start location,
determine, for each of the plurality of generated candidates, an evaluation value that is based on the amount of energy that the vehicle is estimated to consume when the vehicle moves along the movement route, and
generate the movement control information by selecting a candidate from among the plurality of candidates based on the determined evaluation values.

3. The control device according to claim 2, wherein the generation code is configured to cause the at least one processor to determine the evaluation value that is further based on the preparation waiting time, in a case in which the vehicle moves along the movement route, from when the vehicle arrives at the start location to when the preparation is completed.

4. The control device according to claim 2, wherein
each of the plurality of candidates further includes an operation mode of the vehicle at a time of movement along the movement route, and
the generation code is configured to cause the at least one processor to determine, for each of the plurality of candidates, the evaluation value that is based on the amount of energy that is estimated to be consumed by the vehicle when the vehicle moves along the movement route in the operation mode.

5. The control device according to claim 2, wherein the generation code is configured to cause the at least one processor to determine, for each of the plurality of candidates, the evaluation value that is further based on whether or not the standby position exists at the start location or a location within the vicinity of the start location, located at a distance shorter than a predetermined distance from the start location, the standby position being a position for the vehicle to stand by.

6. The control device according to claim 2, wherein the generation code is configured to cause the at least one processor to determine, for each of the plurality of candidates, the evaluation value that is further based on start waiting time from when the preparation is completed to when the transportation is started.

7. The control device according to claim 2, wherein
the acquisition code configured to cause the at least one processor to further acquire start information indicating a start time limit of the transportation of the target, and
the generation code is configured to cause the at least one processor to determine, for each of the plurality of candidates, the evaluation value that is further based on the start information.

8. The control device according to claim 2, wherein the generation code is configured to cause the at least one processor to estimate the amount of energy that the vehicle consumes, based on distance of the movement route.

9. The control device according to claim 2, wherein the generation code is configured to cause the at least one processor to estimate the amount of energy that the vehicle consumes, based on change in altitude of the vehicle occurring while the vehicle moves along the movement route.

10. The control device according to claim 2, wherein
the generation code is configured to cause the at least one processor to generate the movement control information for each of a plurality of vehicles, and
the program code further includes selection code configured to cause the at least one processor to select a vehicle caused to transport the target from among the plurality of vehicles, based on the evaluation value used for generation of the movement control information.

11. The control device according to claim 10, wherein the program code further includes control code configured to cause the at least one processor to perform, on the selected vehicle, control to cause the selected vehicle to move from a location of the selected vehicle to the start location, based on the movement control information.

12. The control device according to claim 1, wherein
the generation code is configured to cause the at least one processor to generate the movement control information by (i) generating a plurality of candidates of the movement control information, (ii) determining an evaluation value for each of the plurality of generated candidates, and, (iii) based on the determined evaluation values, selecting a candidate from among the plurality of candidates,
each of the plurality of candidates includes a movement route that is a route starting from the location of the vehicle and reaching the start location and that causes movement time of the vehicle to be greater than or equal to the preparation time or causes the arrival time of the vehicle at the start location to be later than or equal to the preparation completion time, and
the generation code is configured to cause the at least one processor to determine the evaluation value, based on the amount of energy that the vehicle is estimated to consume when the vehicle moves along the movement route.

13. The control device according to claim 1, wherein
the generation code is configured to cause the at least one processor to generate the movement control information by (i) generating a plurality of candidates of the movement control information, (ii) determining an evaluation value for each of the plurality of generated candidates, and, (iii) based on the determined evaluation values, selecting a candidate from among the plurality of candidates,

each of the plurality of candidates includes a movement route starting from the location of the vehicle and reaching the start location, and the generation code is configured to cause the at least one processor to determine the evaluation value, based on the amount of energy that the vehicle is estimated to consume in a case in which the vehicle moves along the movement route and the preparation waiting time, in the case, from when the vehicle arrives at the start location to when the preparation is completed.

14. A system comprising:

a vehicle capable of storing a target of an order;

at least one memory storing program code; and at least one processor configured to access the program code and operate as instructed by the program code, wherein the program code includes:

acquisition code configured to cause the at least one processor to acquire, when the order is accepted, vehicle location information indicating a location of the vehicle, start location information indicating a start location at which transportation of the target is started, and preparation information indicating preparation time required for preparation to bring a state of the target into a state where the transportation is startable or a preparation completion time at which the preparation is completed;

generation code configured to cause the at least one processor to generate movement control information for causing the vehicle to move from the location of the vehicle to the start location, based on (i) an amount of energy that the vehicle is estimated to consume to move from the location indicated by the acquired vehicle location information to the start location indicated by the acquired start location information, and (ii) the preparation time or the preparation completion time indicated by the acquired preparation information;

determination code configured to cause the at least one processor to determine an arrival time of the vehicle at the start location such that the arrival time does not precede completion of the preparation of the target; and controlling code configured to cause the at least one processor to control, based on a preparation waiting time being greater than a threshold time and based on a standby position being within a vicinity of the start location, the vehicle to move to the standby position, and return from the standby position to the start location based on the preparation completion time;

wherein the controlling code is further configured to:

cause the at least one processor to transmit the movement control information including a movement route to the vehicle via a data communication circuit, the movement route comprising a sequence of nodes with latitude, longitude, and altitude coordinates for navigation, and cause the vehicle to execute movement processing that generates control signals for vehicle motors based on the movement route.

15. A method that a control device or a system executes, the method comprising:

when an order is accepted, acquiring vehicle location information indicating a location of a vehicle capable of storing a target of the order, start location information indicating a start location at which transportation of the target is started, and preparation information indicating preparation time required for preparation to bring a state of the target into a state where the transportation is startable or a preparation completion time at which the preparation is completed;

generating movement control information for causing the vehicle to move from the location of the vehicle to the start location, based on (i) an amount of energy that the vehicle is estimated to consume to move from the location indicated by the acquired vehicle location information to the start location indicated by the acquired start location information, and (ii) the preparation time or the preparation completion time indicated by the acquired preparation information;

determining an arrival time of the vehicle at the start location such that the arrival time does not precede completion of the preparation of the target; and controlling, based on a preparation waiting time being greater than a threshold time and a standby position being within a vicinity of the start location, the vehicle to move to the standby position, and return from the standby position to the start location based on the preparation completion time;

transmitting the movement control information including a movement route to the vehicle via a data communication circuit, the movement route comprising a sequence of nodes with latitude, longitude, and altitude coordinates for navigation, and causing the vehicle to execute movement processing that generates control signals for vehicle motors based on the movement route.

16. The control device according to claim 3, wherein each of the plurality of candidates further includes an operation mode of the vehicle at a time of movement along the movement route, and the generation code is configured to cause the at least one processor to determine, for each of the plurality of candidates, the evaluation value that is based on the amount of energy that is estimated to be consumed by the vehicle when the vehicle moves along the movement route in the operation mode.

17. The control device according to claim 3, wherein the generation code is configured to cause the at least one processor to determine, for each of the plurality of candidates, the evaluation value that is further based on whether or not the standby position exists at the start location or a location within the vicinity of the start location, located at a distance shorter than a predetermined distance from the start location, the standby position being a position for the vehicle to stand by.

18. The control device according to claim 4, wherein the generation code is configured to cause the at least one processor to determine, for each of the plurality of candidates, the evaluation value that is further based on whether or not the standby position exists at the start location or a location within the vicinity of the start location, located at a distance shorter than a predetermined distance from the start location, the standby position being a position for the vehicle to stand by.

19. The control device according to claim 3, wherein the generation code is configured to cause the at least one processor to determine, for each of the plurality of candidates, the evaluation value that is further based on start waiting time from when the preparation is completed to when the transportation is started.

20. The control device according to claim 4, wherein the generation code is configured to cause the at least one processor to determine, for each of the plurality of candidates, the evaluation value that is further based on start waiting time from when the preparation is completed to when the transportation is started.

\* \* \* \* \*